US010623535B2

(12) United States Patent
Ooishi et al.

(10) Patent No.: US 10,623,535 B2
(45) Date of Patent: Apr. 14, 2020

(54) SIGNAL PROCESSING APPARATUS AND SIGNAL PROCESSING METHOD

(71) Applicant: Sony Corporation, Tokyo (JP)

(72) Inventors: Noriaki Ooishi, Kanagawa (JP); Satoshi Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 15/578,418

(22) PCT Filed: Jul. 1, 2016

(86) PCT No.: PCT/JP2016/069645
§ 371 (c)(1),
(2) Date: Nov. 30, 2017

(87) PCT Pub. No.: WO2017/010315
PCT Pub. Date: Jan. 19, 2017

(65) Prior Publication Data
US 2018/0213070 A1    Jul. 26, 2018

(30) Foreign Application Priority Data

Jul. 15, 2015  (JP) .................... 2015-141049

(51) Int. Cl.
*H04L 29/08* (2006.01)
*H04N 21/4425* (2011.01)
(Continued)

(52) U.S. Cl.
CPC ..... *H04L 69/324* (2013.01); *H04N 21/42615* (2013.01); *H04N 21/434* (2013.01); *H04N 21/4425* (2013.01); *H04N 21/615* (2013.01)

(58) Field of Classification Search
CPC .................................................. H04L 69/324
See application file for complete search history.

(56) References Cited

U.S. PATENT DOCUMENTS

2005/0147053 A1    7/2005  Saito et al.
2009/0225780 A1*   9/2009  Tatsumi ................. H04L 47/10
                                                             370/474
2017/0279865 A1*   9/2017  Iguchi ................ H04B 7/18526

FOREIGN PATENT DOCUMENTS

WO        2009/021192 A1    2/2009

OTHER PUBLICATIONS

Aoki, S., et al., "Efficient Multiplexing Scheme for IP Packets over the Advanced Satellite Broadcasting System," IEEE Transactions on Consumer Electronics, vol. 55, Issue: 1, pp. 1-10, Feb. 2009.

(Continued)

*Primary Examiner* — Kodzovi Acolatse
*Assistant Examiner* — Abdeltif Ajid
(74) *Attorney, Agent, or Firm* — Michael Best & Friedrich LLP

(57) ABSTRACT

The present technology relates to a signal processing apparatus and a signal processing method that enable to accurately specify a boundary between packets.
A signal processing apparatus includes a block information acquisition unit which specifies a block length from a transmission parameter, attached to a block, of a multiplexed stream including the series of blocks, a packet information acquisition unit which analyzes the block and acquires a packet parameter, a pattern information acquisition unit which analyzes the block and acquires specific pattern position information, and a packet division unit which specifies a boundary between the packets included in the block on the basis of the block length, the packet parameter, and the specific pattern position information. The present technology is capable of being applied to, for example, a signal processing apparatus that processes a broadcast wave.

12 Claims, 32 Drawing Sheets

(51) Int. Cl.
     *H04N 21/426*    (2011.01)
     *H04N 21/61*     (2011.01)
     *H04N 21/434*    (2011.01)

(56) References Cited

OTHER PUBLICATIONS

"Transmission System for Advanced Wide Band Digital Satellite Broadcasting," Association of Radio Industries and Businesses, ARIB STD-B44 Version 2.0-E1, pp. 5-14, 47-53, 67-72, and 83, Jul. 31, 2014.

"Transmission System for Advanced Wide Band Digital Satellite Broadcasting," Association of Radio Industries and Businesses, ARIB STD-B44 Version 2.0, pp. 1-173.

* cited by examiner

FIG. 28

| | PACKET 1 A | PACKET 2 B | PACKET 3 C | PACKET 4 A | PACKET 5 B | PACKET 6 C |
|---|---|---|---|---|---|---|
| A INPUT PACKET ROW | | | | | | |

| | PACKET 1 A | PACKET 2 B | PACKET 3 C | PACKET 4 A | PACKET 5 B | PACKET 6 C |
|---|---|---|---|---|---|---|
| B OUTPUT PACKET ROW | | | | | | |

| | PACKET 1 A | PACKET 2 B | PACKET 3 C | PACKET 4 A′ | PACKET 5 B′ | PACKET 6 C′ |
|---|---|---|---|---|---|---|
| C OUTPUT PACKET ROW | | | | | | |

| | PACKET 1 A | PACKET 2 B | PACKET 3 C′ | PACKET 4 A | PACKET 5 B | PACKET 6 C′ |
|---|---|---|---|---|---|---|
| D OUTPUT PACKET ROW | | | | | | |

SIGNAL PROCESSING APPARATUS AND SIGNAL PROCESSING METHOD

TECHNICAL FIELD

The present technology relates to a signal processing apparatus and a signal processing method. More particularly, the present technology relates to a signal processing apparatus and a signal processing method suitable for receiving, decoding, reproducing, recording, and re-distributing a multiplexed stream that has been broadcasted.

BACKGROUND ART

In the field of digital television broadcasting, data such as video and audio is packetized, and then multiplexed in a synchronously reproducible format. As a packet format with a variable length structure, for example, a type length value (TLV) format has been known.

At the time of transmission of the multiplexed stream including a plurality of variable length packets, a transmission side divides the multiplexed stream into data blocks (simply referred to as block below) in error correction processing unit and transmits the block as adding an error correction code to each block. At this time, a block boundary and a packet boundary do not particularly coincide with each other, and a single packet may straddle the plurality of blocks. Furthermore, a single block may contain a plurality of packets.

On the reception side, the error correction processing is performed on each received block, and the blocks obtained as a result of the error correction processing are coupled to each other to obtain the multiplexed stream. In Non-Patent Document 1, it is specified that in a case where the error correction processing of the reception block is not correctly performed on the reception side, all the packets included in the block, including the packets provided across the previous and the following blocks, are invalidated (replaced with null packet) or discarded.

CITATION LIST

Non-Patent Document

Non-Patent Document 1: ARIB STD-B44 Transmission System for Advanced Wide Band Digital Satellite Broadcasting Standard Version 2.0

SUMMARY OF THE INVENTION

Problems to be Solved by the Invention

In the analysis of a multiplexed stream having a variable length packet structure, if "data length" parameter is incorrect, the correct position of the beginning of the next packet cannot be recognized. As a result, the packet cannot be correctly invalidated. There has been a possibility that the processing fails. On the other hand, the method disclosed in Non-Patent Document 1 does not specify a case where an error is included in the "data length" parameter.

Therefore, it has been expected to be able to cope with a case where an error is included in the "data length" parameter so that processing does not fail.

Furthermore, all the packets included in the reception block to which error correction has not been normally performed are invalidated regardless of whether the packet includes an error. Therefore, even if a normal (does not include error) packet is included in the invalidated packets, there has been no method to process the normal packet (decoding, reproducing, recording, re-distributing, and the like).

It has been expected to provide a mechanism that allows such normal packets to be used for the decoding, the reproduction, the recording, the re-distribution, and the like without invalidating the packets as possible.

The present technology has been made in view of such a situation. An object of the present technology is to cope with a case where an error is included in a predetermined parameter and to perform processing on normal packets without invalidating the packets as possible.

Solutions to Problems

A first signal processing apparatus according to one aspect of the present technology includes a block information acquisition unit which specifies a block length from a transmission parameter, attached to a block, of a multiplexed stream including a series of blocks, a packet information acquisition unit which analyzes the block and acquires a packet parameter, a pattern information acquisition unit which analyzes the block and acquires specific pattern position information, and a packet division unit which specifies a boundary between the packets included in the block on the basis of the block length, the packet parameter, and the specific pattern position information.

The packet division unit can detect and correct an error of a predetermined parameter of the packet.

The packet parameter can be a parameter relating to a synchronization pattern of the packet.

The packet parameter can be a parameter relating to a data length of the packet.

The specific pattern position information can be position information of a value set by a predetermined standard.

On the basis of a parameter of a subpacket included in the packet obtained by analyzing the packet and packet internal specific pattern position information, a boundary between the subpackets can be further specified.

An error of a predetermined parameter of the subpacket can be detected and corrected.

The parameter of the subpacket can be a parameter relating to a synchronization pattern of the subpacket.

The parameter of the subpacket can be a parameter relating to a data length of the subpacket.

The packet internal specific pattern position information can be position information of a value set by a predetermined standard.

The packet can be a TLV packet, the block can be a main signal of a slot, and the transmission parameter can be TMCC information.

A first signal processing method according to one aspect of the present technology includes: specifying a block length from a transmission parameter attached to a block of a multiplexed stream including the series of blocks; analyzing the block and acquiring a packet parameter; analyzing the block and acquiring specific pattern position information; and specifying a boundary between packets included in the block on the basis of the block length, the packet parameter, and the specific pattern position information.

A second signal processing apparatus according to one aspect of the present technology includes a packet information acquisition unit which analyzes a packet of a multiplexed stream including a series of packets and acquires a parameter of the packet and a packet rewrite unit which rewrites a content of the packet by using the parameter which is acquired by the packet information acquisition unit.

The packet rewrite unit can invalidate the packet on the basis of a reception state.

The packet rewrite unit can invalidate the packet on the basis of a state of subsequent processing.

The packet rewrite unit can invalidate the packet on the basis of the parameter of the packet.

The parameter of the packet can be a parameter relating to a packet identifier of the packet.

The packet can be a TLV packet.

The signal processing apparatus can further include an output interface unit which generates a packet synchronization signal capable of specifying a boundary between the packets as receiving an output from the packet rewrite unit as an input and outputs the packet synchronization signal in synchronization with a packet data signal.

A second signal processing method according to one aspect of the present technology includes acquiring a parameter of a packet by analyzing the packet of a multiplexed stream including the series of packets and rewriting a content of the packet by using the acquired parameter.

In a first signal processing apparatus and signal processing method according to one aspect of the present technology, a block length is specified from a transmission parameter attached to a block of a multiplexed stream including a series of blocks, a packet parameter is acquired by analyzing the block, specific pattern position information is acquired by analyzing the block, and a boundary between packets included in the block is specified on the basis of the block length, the packet parameter, and the specific pattern position information.

In a second signal processing apparatus and signal processing method according to one aspect of the present technology, a parameter of a packet is acquired by analyzing a packet of a multiplexed stream including the series of packets, and a content of the packet is rewritten by using the acquired parameter.

Effects of the Invention

According to one aspect of the present technology, it is possible to cope with a case where an error is included in a predetermined parameter and to process a normal packet without invalidating the packet as possible.

Note that the effects described herein are not limited and that the effect may be any effects described in the present disclosure.

BRIEF DESCRIPTION OF DRAWINGS

FIG. 28 is a diagram to describe the processing of the packet processing unit.

MODE FOR CARRYING OUT THE INVENTION

An embodiment for carrying out the present technology (referred to as an embodiment below) will be described below.

Figure 1:
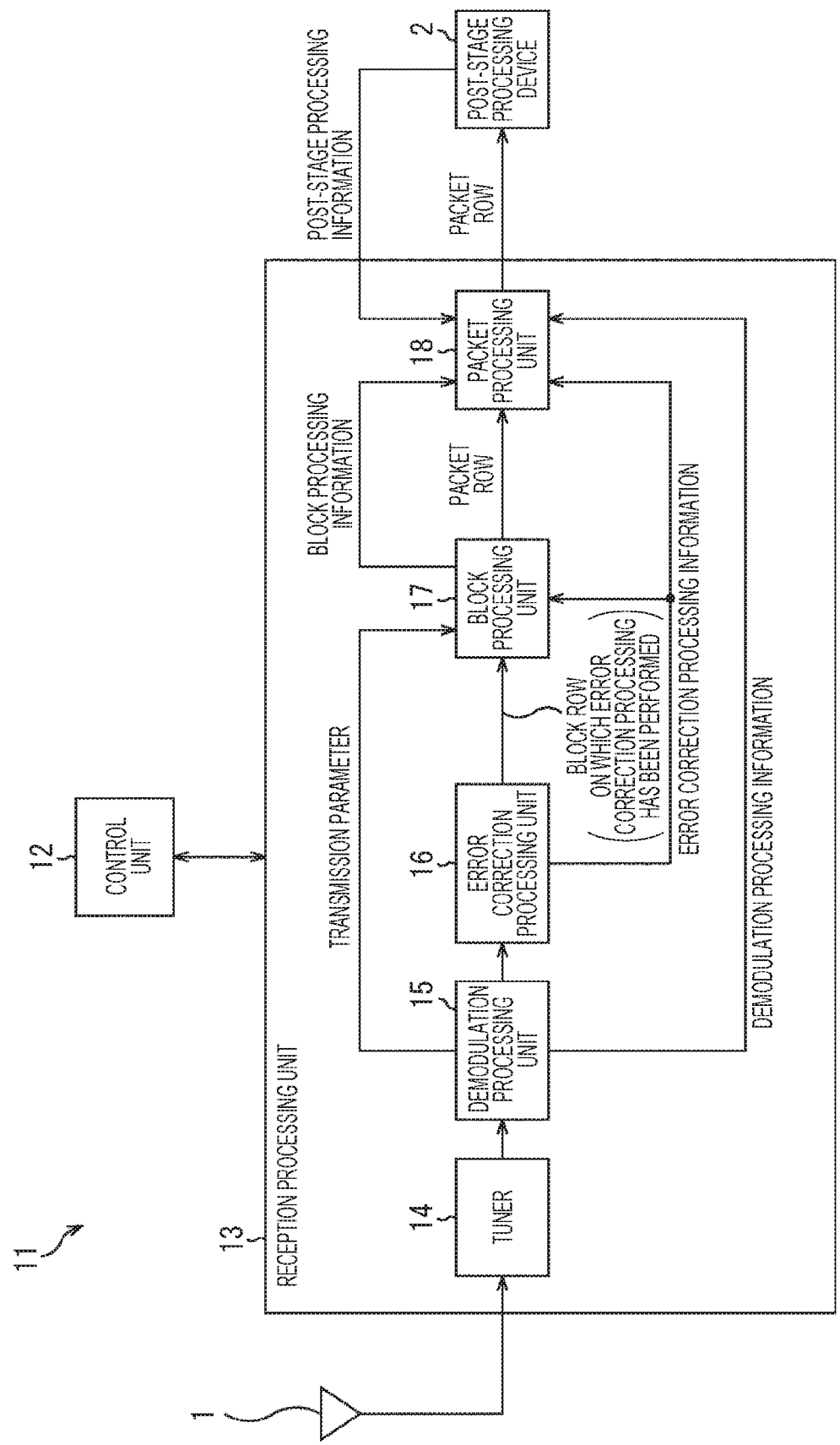
FIG. 1 is a diagram of a configuration of an embodiment of a reception device to which the present technology has been applied.

FIG. 1 is a block diagram of a configuration of an embodiment of a reception device to which the present technology has been applied. A reception device 11 illustrated in FIG. 1 includes a control unit 12 and a reception processing unit 13. The control unit 12 controls the reception processing unit 13 and includes, for example, a user-side operation unit such as a remote controller.

The reception processing unit 13 includes a tuner 14, a demodulation processing unit 15, an error correction processing unit 16, a block processing unit 17, and a packet processing unit 18.

The tuner 14 supplies a signal of a channel (transmission path encoded signal) selected from the broadcast waves received by an external broadcast wave receiving unit, for example, an antenna 1 in the example illustrated in FIG. 1 to the demodulation processing unit 15. Note that the broadcast wave receiving unit may be a unit to which the broadcast waves are supplied via a predetermined cable.

The demodulation processing unit 15 performs demodulation processing (synchronization processing and equalization processing) on the transmission path encoded signal supplied from the tuner 14, and supplies the demodulated signal to the error correction processing unit 16. Furthermore, the demodulation processing unit 15 obtains a transmission parameter and supplies the transmission parameter to the block processing unit 17. In addition, the demodulation processing unit 15 supplies demodulation processing information to the packet processing unit 18.

The "transmission parameter" depends on the digital broadcast standard. The "demodulation processing information" includes a transmission error rate. The "transmission error rate" is information indicating a reception state, and indicates, for example, a signal-noise ratio (SNR) and a modulation error rate (MER).

The error correction processing unit 16 performs error correction processing on the demodulated signal supplied from the demodulation processing unit 15 and supplies the signal on which the error correction processing has been performed to the block processing unit 17 for each block. Furthermore, error correction processing information for each block is supplied to each of the block processing unit 17 and the packet processing unit 18.

The "block" depends on the digital broadcast standard. Furthermore, the "error correction processing information" includes error correction processing results and the transmission error rate. Furthermore, the "error correction processing results" indicate whether the block was error correction OK (there was no error or although there was an error, the error was corrected), or error correction NG (there was an error and the error was not corrected).

The "transmission error rate" is information indicating a reception state, and indicates, for example, a bit error rate (BER), a forward error correction (FEC) rate (FEC block error rate (FER)).

On the basis of the transmission parameter supplied from the demodulation processing unit 15 and the error correction processing information (error correction processing results) supplied from the error correction processing unit 16, the block processing unit 17 performs processing on the block on which the error correction processing has been performed supplied from the error correction processing unit 16 and supplies the processed data to the packet processing unit 18 for each packet. Furthermore, the block processing unit 17 supplies block processing information for each block to the packet processing unit 18.

The "packet" depends on the digital broadcast standard. The "block processing information" includes the error correction processing results in a packet unit. The "error correction processing results in a packet unit" indicates whether the packet is error correction OK (included in the error correction OK block) or error correction NG (included in the error correction NG block).

On the basis of the demodulation processing information (transmission error rate) supplied from the demodulation processing unit 15, the error correction processing information (transmission error rate) supplied from the error correction processing unit 16, the block processing information (error correction processing results in a packet unit) supplied from the block processing unit 17, and post-stage processing information (for example, decoding error rate) supplied from an external post-stage processing device 2 (for example, decoder), the packet processing unit 18 performs processing on the packet supplied from the block processing unit 17, and outputs the processed packet to the external post-stage processing (for example, decoder).

The "decoding error rate" indicates, for example, the number of decoding errors per unit time in video/audio decoding processing.

Here, the blocks and the packets processed by the reception processing unit 13 will be described with reference to FIGS. 2 and 3.

Figure 2:
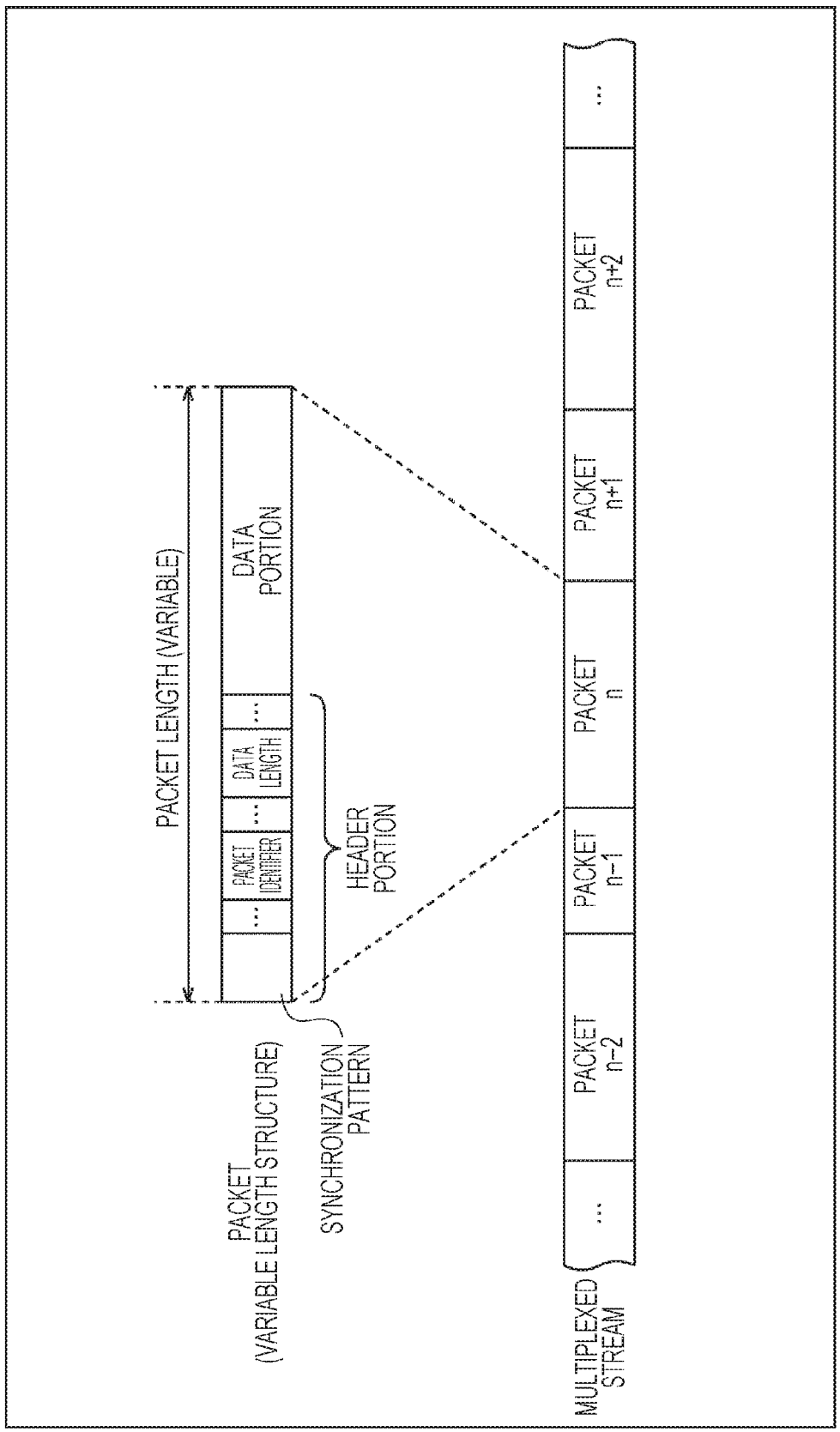
FIG. 2 is a diagram of structures of a variable length packet and a multiplexed stream.

In FIG. 2, a general data structure of a variable length packet and a structure of a multiplexed stream including the plurality of variable length packets are illustrated. As illustrated in FIG. 2, each packet (variable length) includes a header portion and a data portion, and the entire length of the packet (packet length) is described in the "data length" parameter included in the header portion and can be found from the parameter.

Furthermore, the header portion includes a "synchronization pattern" to synchronize the packets and a "packet identifier" to identify a content of the packet.

Here, the description will be continued by using the packet including the parameters such as the "synchronization pattern" and the "packet identifier" as an example. However, in some packet formats, these parameters do not exist. The present technology can be applied to either of the packet which includes the "synchronization pattern" and the "packet identifier" and the packet which does not include the "synchronization pattern" and the "packet identifier".

Furthermore, in the present embodiment, the packet format with the variable length structure is used, and, for example, a type length value (TLV) format is taken as an example. However, the present technology can be applied to a case of using a GSE, GSE-Lite (DVB), and IP packets.

Furthermore, regarding the TLV, the packet format and the like are specified in ARIB STD-B44 Transmission System for Advanced Wide Band Digital Satellite Broadcasting Standard Version 2.0 (appropriately referred to as Non-Patent Document 1).

In a case where the reception processing unit 13 is configured to be able to handle the signal of the digital broadcasting standard of Non-Patent Document 1, the "transmission parameter" can be transmission and multiplexing configuration control (TMCC) information. Furthermore, the "block" can be a "main signal of a slot". Furthermore, the "packet" can be a "TLV packet".

Figure 3:
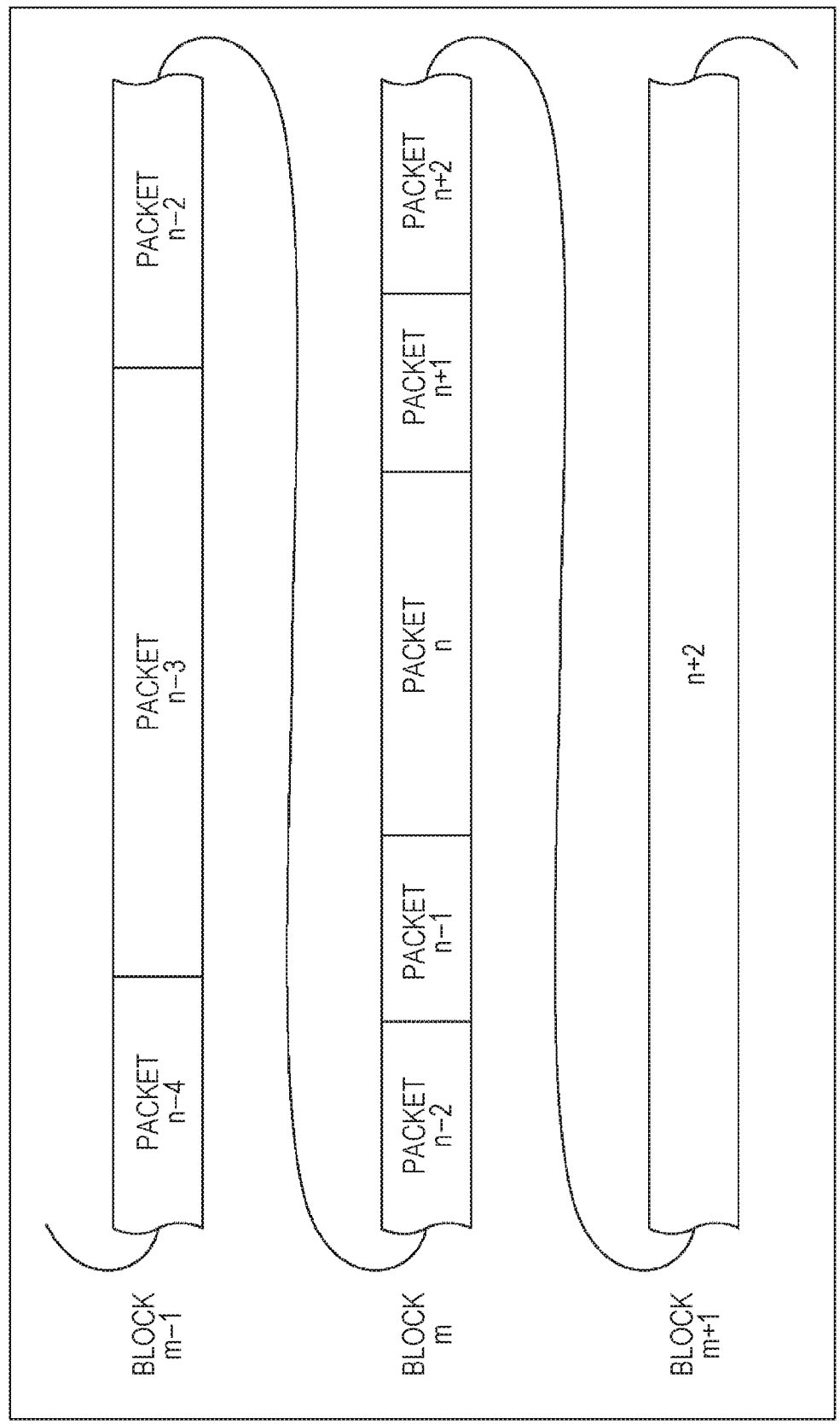
FIG. 3 is a diagram to describe transmission of the multiplexed stream.

FIG. 3 is a diagram to describe transmission of a multiplexed stream. On the transmission side, the multiplexed stream is divided into blocks of error correction processing units, and an error correction code is added to each block, and the block is transmitted. At this time, a block boundary and a packet boundary do not particularly coincide with each other, and a single packet may straddle the plurality of blocks. Furthermore, a single block may contain a plurality of packets.

For example, with reference to FIG. 3, a block m-1 includes a packet n-4, a packet n-3, and a packet n-2. The packet n-4 is a packet that continues from a previous block m-2 which is not shown, and the packet n-2 is a packet that continues to a next block m.

The block m includes the packet n−2, a packet n−1, a packet n, a packet n+1, and a packet n+2. The packet n−2 is a packet that continues from the previous block m−1, and the packet n+2 is a packet that continues to a next block m+1.

The block m+1 includes the packet n+2. The packet n+2 is a packet that continues from the previous block m and continues to a next block m+2 which is not shown.

In this way, for example, the packet n−2 straddles the block m−1 and the block m, and the packet n−2 is a single packet that straddles the plurality of blocks. Furthermore, the block m and the like include the packet n−2, the packet n−1, the packet n, the packet n+1, and the packet n+2, and a single block includes the plurality of packets.

Such a multiplexed stream is transmitted from the transmission side to the reception side. On the reception side, the error correction processing is performed on each received block, and the blocks obtained as a result of the error correction processing are coupled to each other to obtain the multiplexed stream.

In Non-Patent Document 1, it is specified that in a case where the error correction processing of the reception block is NG (not correctly performed) on the reception side, all the packets included in the block, including the packets provided across the previous and the following blocks, are invalidated (replaced with null packet) or discarded.

For example, in a case where NG occurs in the error correction processing in the block m, all of the packet n−2, the packet n−1, the packet n, the packet n+1, and the packet n+2 included in the block m, the packet n−2 included in block m−1 before the block m, and the packet n+2 included in the block m+1 next to the block m are invalidated or discarded.

In analysis of the multiplexed stream with the variable length packet structure, if the "data length" parameter (FIG. 2) is incorrect, the correct position of the beginning of the next packet is not found. As a result, there is a possibility that the packet cannot be correctly invalidated and the processing fails.

In the method disclosed in Non-Patent Document 1, a case is not described where the "data length" parameter has an error. Therefore, in the reception processing unit 13 to which the present technology has been applied, the "data length" parameter is corrected so that subsequent processing does not fail even in a case where the "data length" parameter has an error.

As will be clarified in detail below, regarding the block in which NG has occurred in the error correction, a boundary between the packets included in the block can be detected on the basis of the transmission parameter, the parameter of the packet obtained by analyzing the block, and position information of a specific pattern. At this time, consistency between the "data length" parameter of the packet and a block length of the block is confirmed, and in a case where the "data length" parameter and the block length are inconsistent, the parameter can be corrected to eliminate the inconsistency.

Furthermore, according to the reception processing unit 13 to which the present technology has been applied, the following points can be improved.

As described above, all the packets included in the reception block in which the error correction is NG have been traditionally invalidated regardless of whether the packet includes an error. Therefore, even if a normal packet (does not include error) is included in the invalidated packets in the block, it has not been possible to perform, for example, decoding and reproduction processing, recording processing, and re-distribution processing on the normal packet.

In the reception processing unit 13 to which the present technology has been applied, a mechanism capable of processing such a normal packet without invalidating the packet as possible is provided. The details will be clarified later. However, even if the packet is included in the block of the error correction NG, the packet can be output as it is (valid packet). However, it is also possible to invalidate and output the packet according to the content of the packet, the reception state, and the situation of the subsequent stage.

The reception processing unit 13 capable of performing such processing will be further described.

<Configuration of Block Processing Unit>

Figure 4:
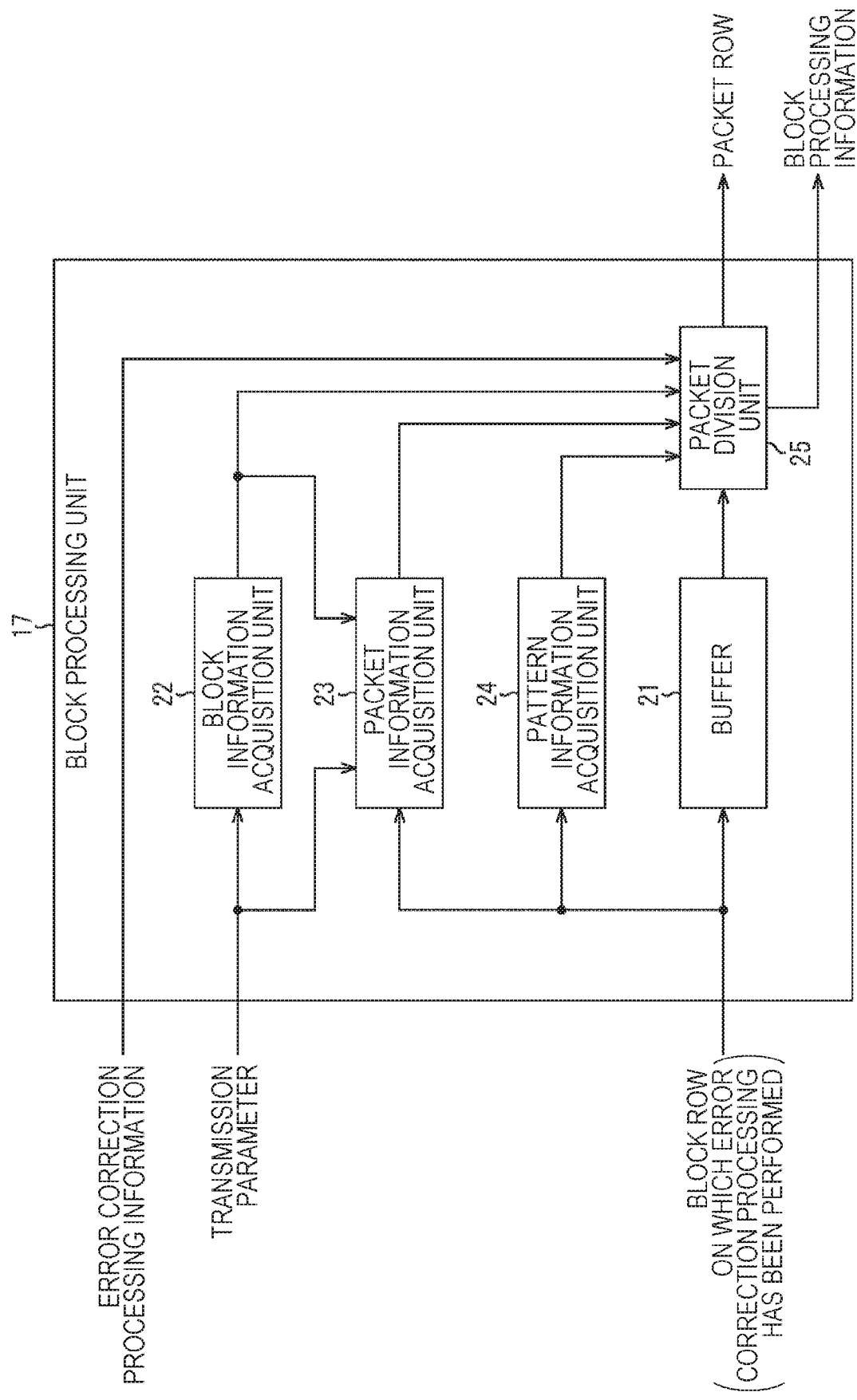
FIG. 4 is a block diagram of an exemplary configuration of a block processing unit.

FIG. 4 is a block diagram of an exemplary configuration of the block processing unit 17 included in the reception processing unit 13 illustrated in FIG. 1. The block processing unit 17 illustrated in FIG. 4 includes a buffer 21, a block information acquisition unit 22, a packet information acquisition unit 23, a pattern information acquisition unit 24, and a packet division unit 25.

The buffer 21 temporarily stores the block, on which the error correction processing has been performed, to be supplied from the error correction processing unit 16. Furthermore, the buffer 21 supplies the stored data to the packet division unit 25.

The block information acquisition unit 22 acquires information regarding the block (referred to as block information below) on the basis of the transmission parameter supplied from the demodulation processing unit 15, and supplies the information to the packet division unit 25 and the packet information acquisition unit 23.

The "block information" is information including an entire length of the block (referred to as block length below).

The packet information acquisition unit 23 analyzes the block on which the error correction processing has been performed supplied from the error correction processing unit 16, acquires information regarding the packet included in the block (referred to as packet information below), and transmits the information to the packet division unit 25.

The "packet information" is information including the "data length" parameter of the packet included in the block.

Note that in the above processing, it is possible to use the transmission parameters supplied from the demodulation processing unit 15 and the block information supplied from the block information acquisition unit 22.

The pattern information acquisition unit 24 analyzes the block on which the error correction processing has been performed supplied from the error correction processing unit 16, acquires information regarding a pattern included in the block (referred to as pattern information below), and supplies the information to the packet division unit 25.

The "pattern information" is information including position information of input data (synchronization pattern) having a predetermined value.

The packet division unit 25 divides the data supplied from the buffer 21 in packet units on the basis of the error correction processing information (error correction processing result) supplied from the error correction processing unit 16, the block information supplied from the block information acquisition unit 22, the packet information supplied from the packet information acquisition unit 23, and the pattern information supplied from the pattern information acquisition unit 24. Furthermore, the packet division unit 25 supplies the block processing information for each block (error correction processing result in packet unit) to the packet processing unit 18.

In a case where the reception processing unit 13 is configured to be able to handle the signal of the digital broadcast standard of the Non-Patent Document 1, the block length (=main signal length of slot) acquired by the block information acquisition unit 22 can be obtained from an internal code encoding rate included in the TMCC information (uniquely determined).

For example, in a case where the internal code encoding rate is 41/120, the main signal length of the slot is 14960 bits (=1870 bytes).

Furthermore, the "data length" parameter acquired by the packet information acquisition unit 23 can be, for example, a "data length" parameter (16 bits) of the TLV packet. For example, in a case where the packet illustrated in FIG. 2 is a TLV packet, the "data length" parameter included in the TLV packet can be a "data length" parameter acquired by the packet information acquisition unit 23. Note that the details of the TLV packet will be described with reference to FIG. 24 later.

Furthermore, the value of the synchronization pattern used by the pattern information acquisition unit 24 can be set to, for example, a value of a first byte of the TLV packet (0x7F). For example, in a case where the packet illustrated in FIG. 2 is the TLV packet, a first byte included in a header portion of the TLV packet is (0x7F), and the value of the first byte can be set to a value of the synchronization pattern used by the pattern information acquisition unit 24.

<Configuration of Packet Processing Unit>

Figure 5:
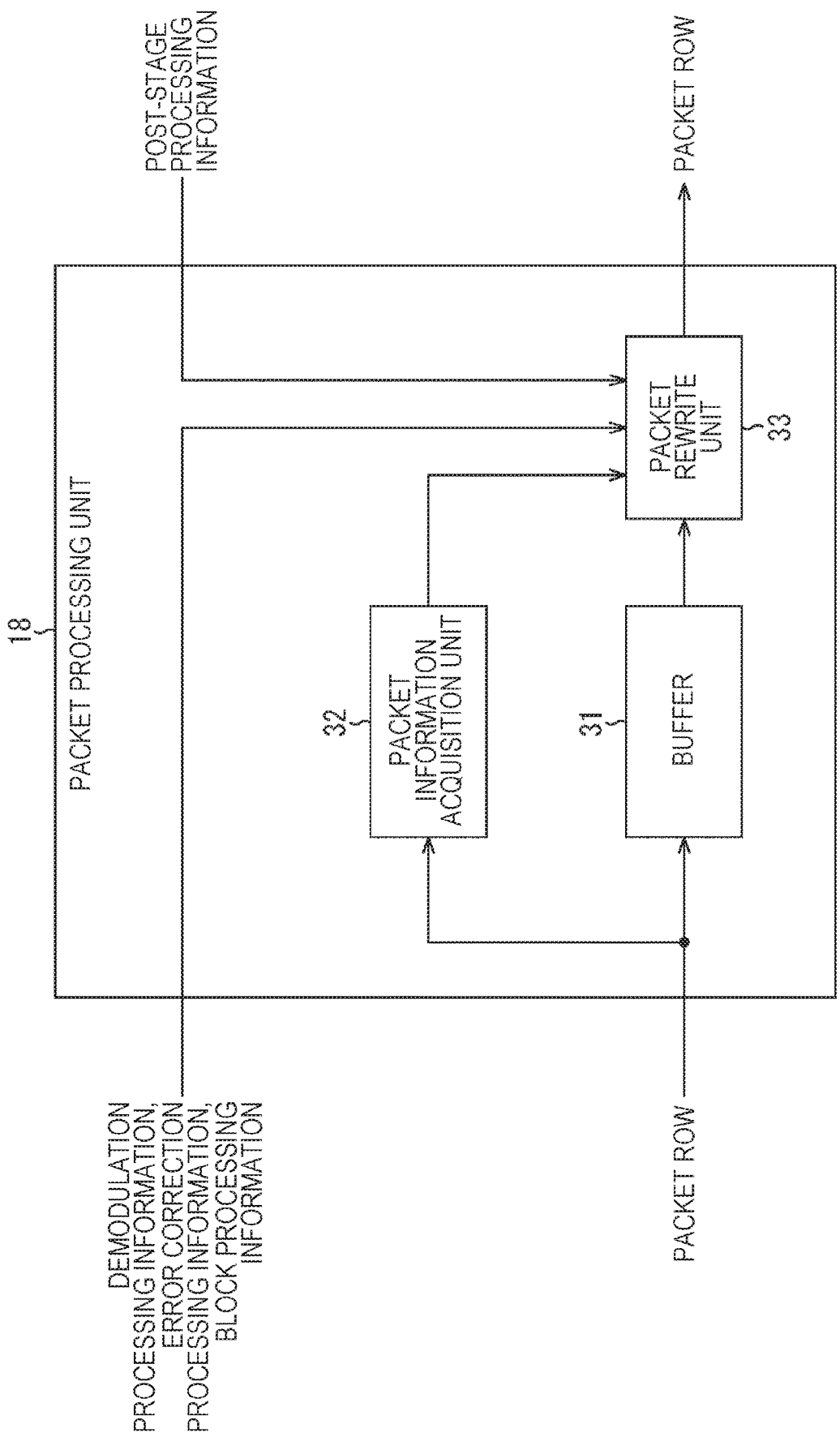
FIG. 5 is a block diagram an exemplary configuration of a packet processing unit.

FIG. 5 is a block diagram of an exemplary configuration of the packet processing unit 18 included in the reception processing unit 13 illustrated in FIG. 1. The packet processing unit 18 illustrated in FIG. 5 includes a buffer 31, a packet information acquisition unit 32, and a packet rewrite unit 33.

The buffer 31 temporarily stores the packet supplied from the block processing unit 17. Furthermore, the buffer 31 supplies the stored data to the packet rewrite unit 33 in a packet unit.

The packet information acquisition unit 32 analyzes the packet supplied from the block processing unit 17, acquires information regarding the packet included in the packet (referred to as packet information below), and supplies the information to the packet rewrite unit 33.

The "packet information" is information including the "packet identifier" parameter of the packet. The "packet identifier" is an identifier depending on the digital broadcast standard.

The packet rewrite unit 33 rewrites the packet supplied from the buffer 31 on the basis of the demodulation processing information (transmission error rate) supplied from the demodulation processing unit 15, the error correction processing information (transmission error rate) supplied from the error correction processing unit 16, the block processing information (error correction processing results in a packet unit) supplied from the block processing unit 17, the packet information supplied from the packet information acquisition unit 32, and the post-stage processing information (for example, decoding error rate) supplied from the external post-stage processing device 2 (FIG. 1). Then, the packet rewrite unit 33 outputs the packet acquired by the rewrite to outside, for example, to the post-stage processing device 2.

In a case where the reception processing unit 13 is configured to be able to handle the signal (TLV packet) of the digital broadcast standard of Non-Patent Document 1, the "packet identifier" acquired by the packet information acquisition unit 32 and used by the packet rewrite unit 33 can be made as follows.

For example, the "packet identifier" can be a "packet identification (packet_type)" parameter (eight bits) of the TLV packet. The "packet identification" parameter is a parameter to identify data stored in a data portion in the TLV packet.

Note that an Internet Protocol version 4 (IPv4) packet, an Internet Protocol version 6 (IPv6) packet, a null packet, and other packet are defined as the data stored in the data portion in the TLV packet. These packets are appropriately referred to as subpackets.

Furthermore, for example, the "packet identifier" can be a parameter of the subpacket included in the TLV packet, such as, a "transmission source address (source_address)" parameter (32 bits/IPv4, 128 bits/IPv6) and a "destination address (destination_address)" parameter (similar) of an Internet Protocol (IP) packet. These parameters indicate a transmission source address and a destination address of the IP packet.

Furthermore, for example, the "packet identifier" can be a parameter of the subpacket included in the TLV packet, such as, a "transmission source port (source_port) parameter (16 bits) and a "destination port (destination_port)" parameter (similar) of a user datagram protocol (UDP) packet. These parameters indicate a transmission source port and a destination port of the UDP packet.

Furthermore, for example, the "packet identifier" can be a parameter of the subpacket included in the TLV packet, such as, a "packet identifier (packet_id)" parameter (16 bits) of a media transport protocol (MPEG) packet (MMTP). These parameters identify the data stored in the data portion in the MMTP packet. The data stored in the data portion relates to a video, audio, subtitles, superimposed text, control information, and the like.

Furthermore, for example, the "packet identifier" can be a combination of two or more parameters described above.

The "packet identifier" to be used is set according to the type of the packet to be processed by the packet rewrite unit 33.

<Processing in Packet Division Unit>

Next, an operation of the reception processing unit 13 will be described. First, processing in the block processing unit 17 of the reception processing unit 13, in particular, processing in the packet division unit 25 will be described. By the processing described below, processing for "correcting the "data length" parameter is performed so that the subsequent processing does not fail".

Figure 6:
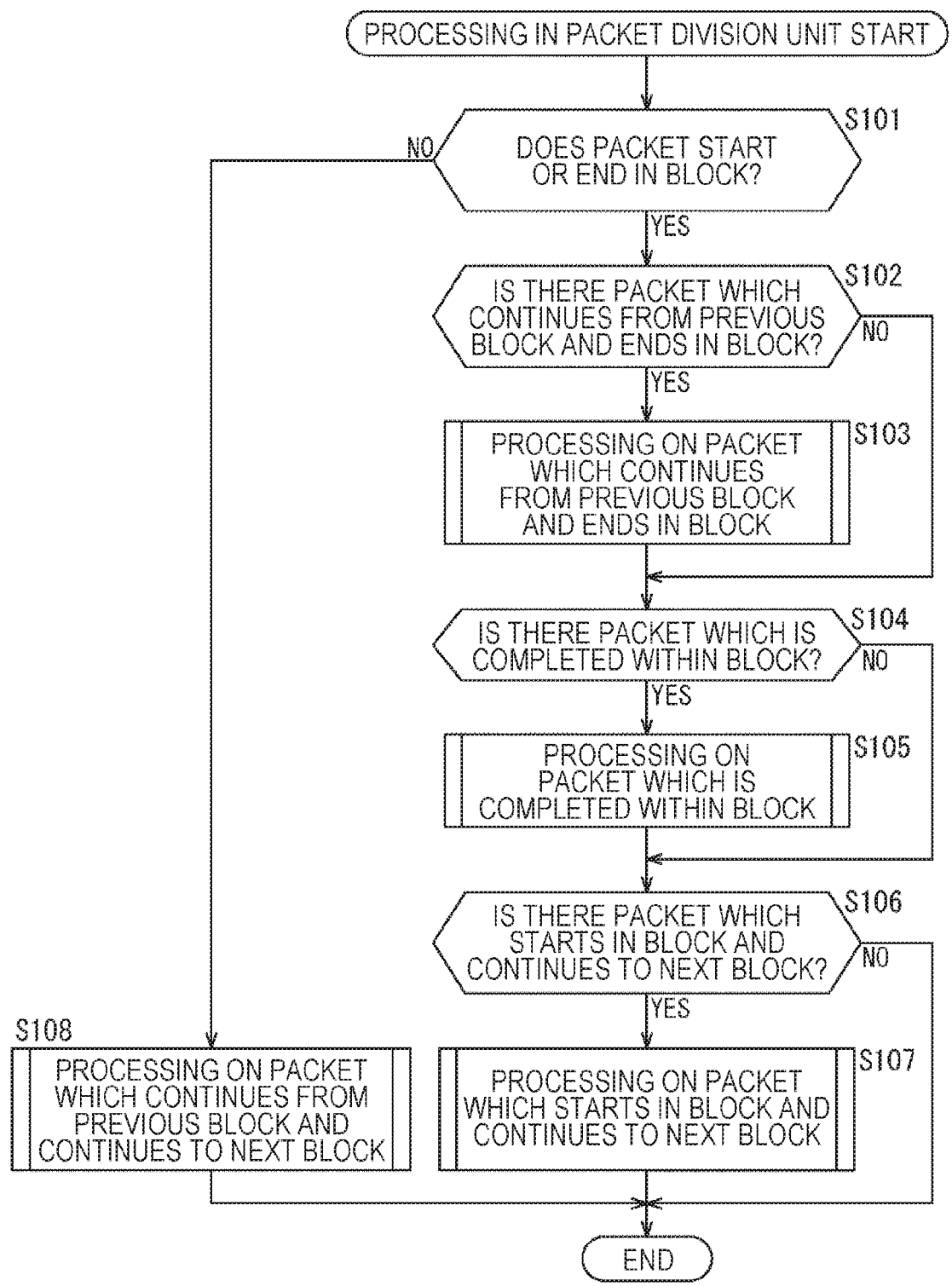
FIG. 6 is a flowchart to describe an operation of a packet division unit.

With reference to the flowchart illustrated in FIG. 6, the processing in the packet division unit 25 will be described. The processing of the flowchart illustrated in FIG. 6 is repeatedly performed each time when a block is input to the block processing unit 17.

In step S101, it is determined whether the packet starts or ends in the block. Referring again to FIG. 3, in a case where the block to be processed is the block m, the block m includes, for example, the packet n−1, the packet n, the packet n+1, and the packet n+2 that are determined that the packets have started in the block.

Furthermore, the block m includes, for example, the packet n−2, the packet n−1, the packet n, and the packet n+1 that are determined that the packets have ended in the block. Therefore, in a case where the block m is to be processed, it is determined in step S101 that the packet starts or ends in the block, and the processing proceeds to step S102.

In a case where the reception processing unit 13 is configured to be able to handle the signal of the digital broadcast standard of Non-Patent Document 1, a top pointer and a last pointer included in the TMCC information can be used to determine whether the packet starts or ends in the block.

Figure 7:
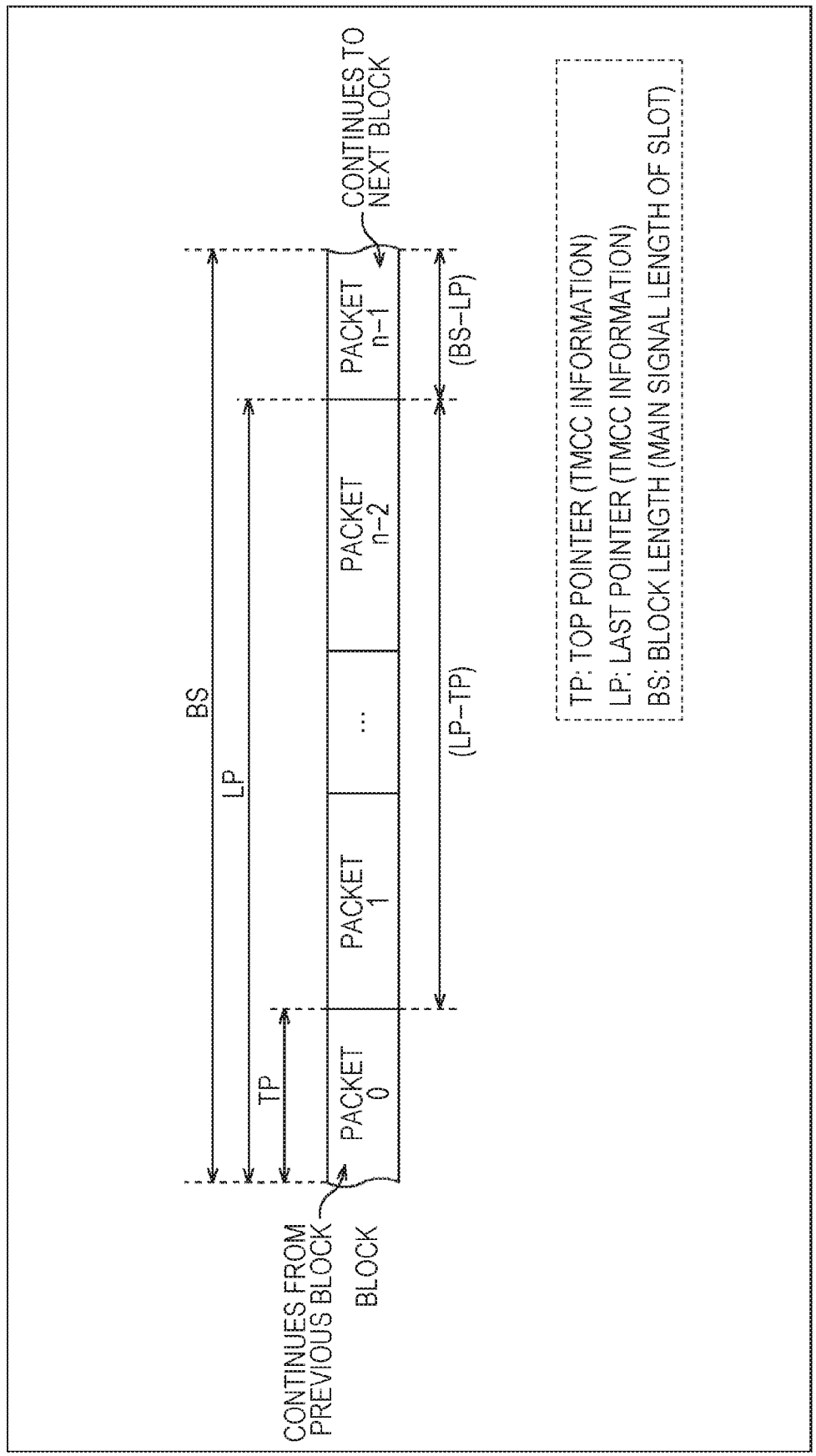
FIG. 7 is a diagram to describe a top pointer and a last pointer.

As illustrated in FIG. 7, the top pointer indicates the position of a first byte of a first packet of the packets stored in each slot. Furthermore, the last pointer indicates the position of a final byte of a final packet+1 of the packets stored in each slot.

In a case where the top pointer is non-0 x FFFF or the last pointer is non-0 x FFFF, it can be determined that the packet starts or ends in the block.

The description returns to the flowchart in FIG. 6. In a case where it has been determined in step S101 that the packet starts or ends in the block, the processing proceeds to step S102. It is determined in step S102 whether there is a packet which continues from the previous block and ends in the block.

Referring again to FIG. 3, for example, in a case where the block m is to be processed, the packet n−2 continues from the previous block m−1 and ends in the block m. Therefore, in a case where a block such as the block m is to be processed, it is determined in step S102 that there is a packet which continues from the previous block and ends in the block, and the processing proceeds to step S103.

In a case where the reception processing unit 13 is configured to be able to handle the signal of the digital broadcast standard of Non-Patent Document 1, the top pointer included in the TMCC information can be used to determine in step S102 whether there is a packet which continues from the previous block and ends in the block. That is, in a case where the top pointer is non-0 x0000 and non-0 xFFFF, it can be determined that there is a packet which continues from the previous block, and it can be determined that there is no packets which continue from the previous block in other cases.

In step S103, processing on the packet which continues from the previous block and ends in the block is performed. The processing on the packet which continues from the previous block and ends in the block performed in step S103 will be described with reference to the flowchart illustrated in FIG. 8.

In step S201, buffer data and the packet which continues from the previous block are coupled to each other to form a single packet. In this case, since packet which continues from the previous block is to be processed, the packets included in the previous block are buffered, and the buffered buffer data and the packet to be processed are coupled to each other to form a single packet.

In step S202, the error correction processing results of the previous block and the block are confirmed. In a case where both the error correction processing results of the previous block and the block are error correction OK, the processing proceeds to step S206.

In this case, the processing is performed on the packet which continues from the previous block and ends in the block. Therefore, in a case where NG occurs in either one of the error correction processing results of the previous block and the block, it is necessary to perform processing to be described later. However, in a case where both the error correction processing results are OK, there is no problem, and the processing proceeds to step S206. Then, the packet is output to the packet processing unit 18 (FIG. 5).

On the other hand, in step S202, in a case where either one of the error correction processing results of the previous block and the block is NG, the processing proceeds to step S203.

In step S203, it is determined whether the "synchronization pattern" parameter of the packet is correct. An expected value of the "synchronization pattern" depends on the digital broadcast standard.

In a case where it has been determined in step S203 that the "synchronization pattern" parameter of the packet is correct, the processing in step S204 is skipped, and the processing proceeds to step S205.

On the other hand, in a case where it has been determined in step S203 that the "synchronization pattern" parameter of the packet is incorrect, the processing proceeds to step S204. In step S204, the "synchronization pattern" parameter of the packet is corrected, and the processing proceeds to step S205.

In step S205, the correcting processing of the "data length" parameter of the packet is performed. In the correcting processing of the "data length" parameter of the packet, in a case where an error is included in the "data length" parameter of the packet, the error is corrected, and in a case where an error is not included in the "data length" parameter of the packet, the parameter is output as it is.

The correcting processing of the "data length" parameter of the packet, which is performed in step S205, will be described with reference to the flowchart in FIG. 9.

In step S301, a packet length expected value of the packet is calculated. In a case where the reception processing unit 13 is configured to be able to handle the signal of the digital broadcast standard of Non-Patent Document 1, the packet length expected value is calculated on the basis of the following formula.

Packet length expected value=buffer data length+top pointer

When the packet length expected value is calculated, the processing proceeds to step S302. Then, the "data length" parameter of the packet is acquired, and a packet length is calculated. In a case where the reception processing unit 13 is configured to be able to handle the signal of the digital broadcast standard of Non-Patent Document 1, the packet length is calculated on the basis of the following formula.

Packet length=4+"data length" parameter

When the packet length is calculated, the processing proceeds to step S303, and it is determined whether there is a next packet. In a case where it has been determined in step S303 that there is the next packet, the processing proceeds to step S304.

In step S304, it is determined whether a synchronization pattern of the next packet is a correct value. In this determination, the synchronization pattern of the next packet is confirmed on the basis of the packet length acquired in the processing in step S302. For example, when the packet n is processed, there should be the synchronization pattern of the next packet at a position ahead from the head of the packet n by the packet length. A pattern located at a position ahead by the packet length is read as a synchronization pattern, and it is determined whether the read synchronization pattern is correct.

In a case where it has been determined in step S304 that the synchronization pattern of the next packet is correct, the processing proceeds to step S305. In a case where it has been determined in step S303 that there is no next packet, the processing proceeds to step S305.

In step S305, it is determined whether the packet length (assumed as packet length calculation value) obtained by the processing in step S302 is equal to the packet length expected value obtained in the processing in step S301.

Figure 8:
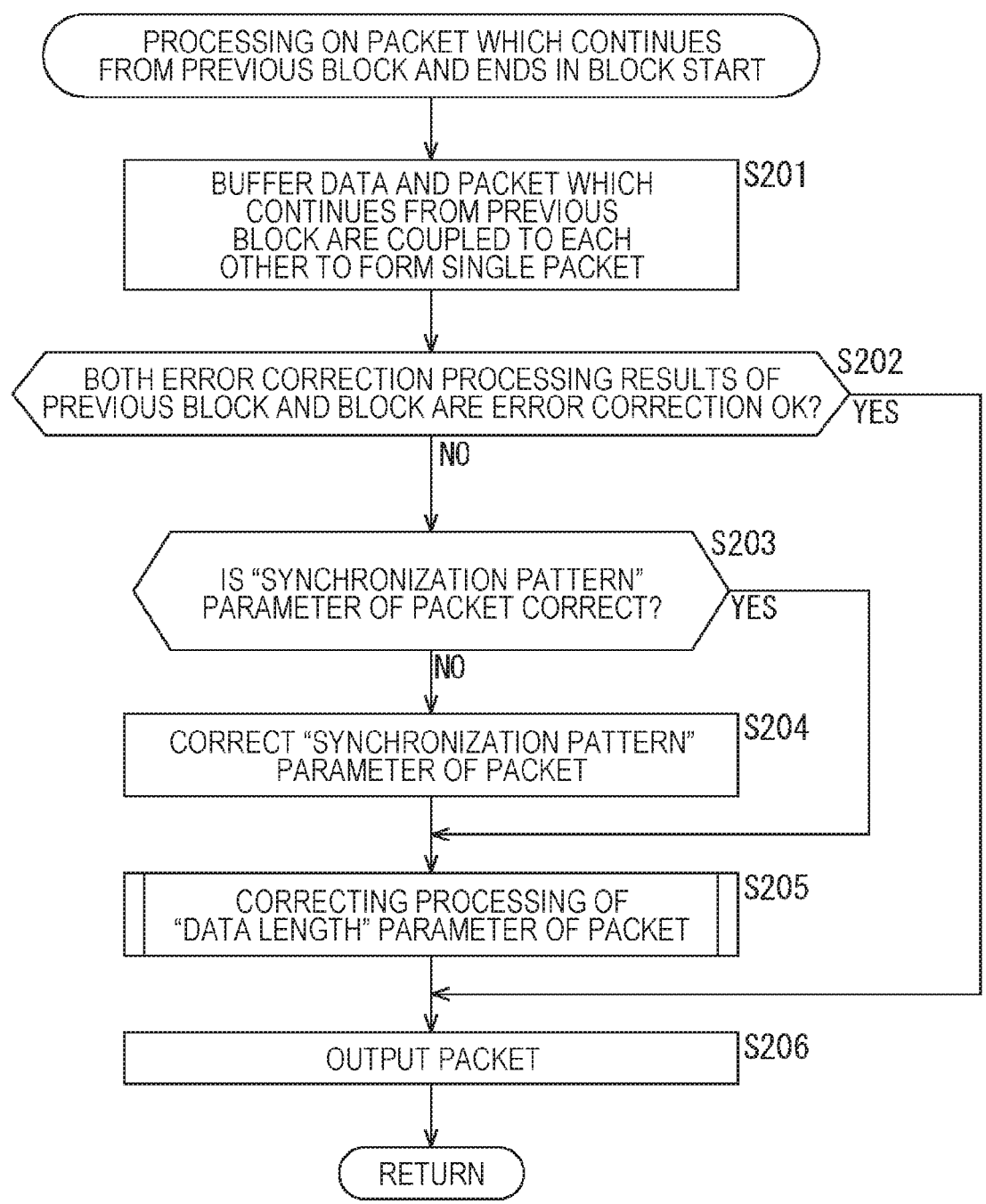
FIG. 8 is a flowchart to describe processing on a packet which continues from a previous block and ends at the block.

In a case where it has been determined in step S305 that the packet length calculation value and the packet length expected value are equal to each other, the processing proceeds to step S306. In step S306, it is determined that the "data length" parameter of the packet is correct, and the processing proceeds to step S206 (FIG. 8).

Figure 9:
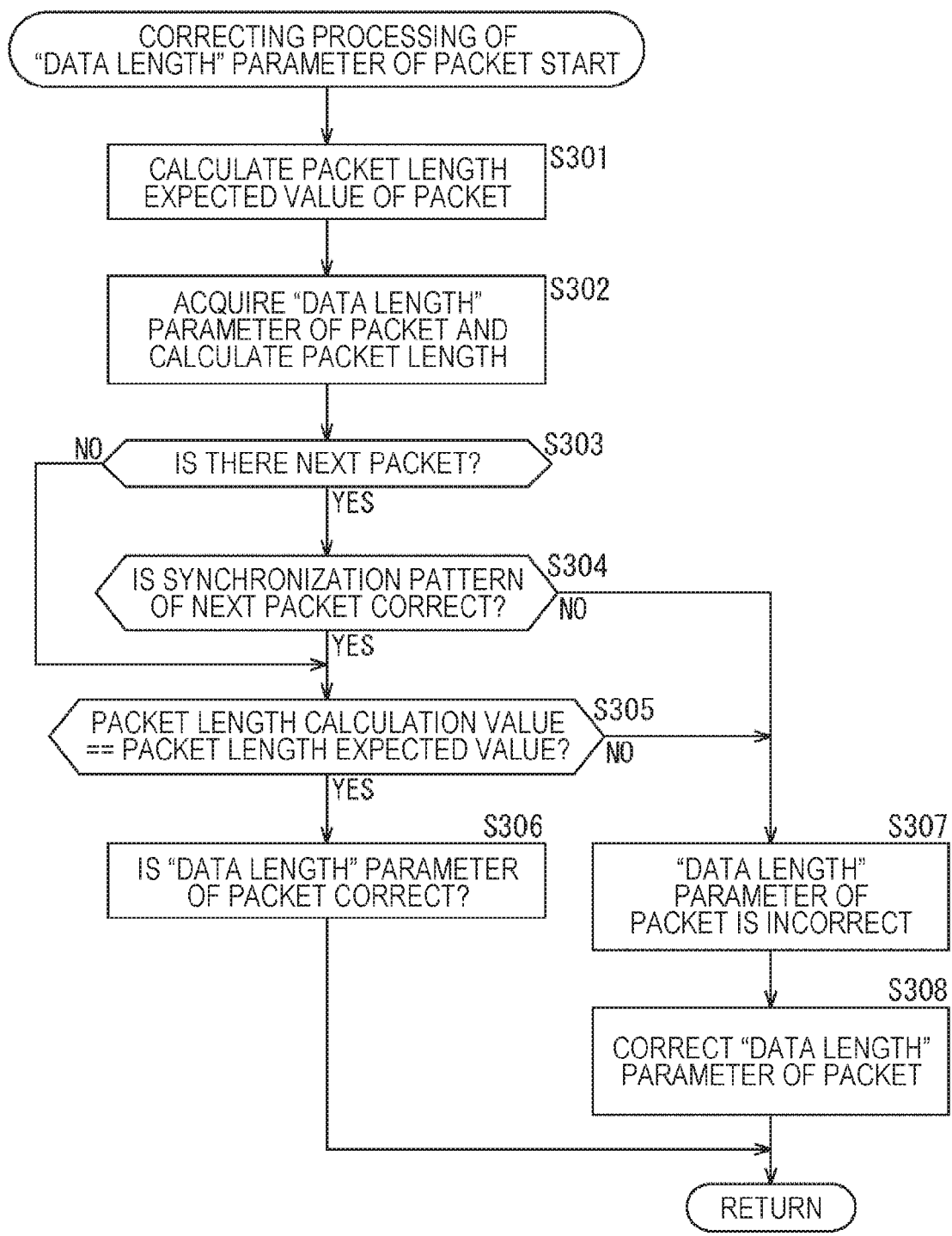
FIG. 9 is a flowchart to describe correcting processing of a "data length" parameter of the packet.

Since this is a case where it has been determined that the "data length" of the packet is correct by performing the processing of the flowchart illustrated in FIG. 9 and it has been determined that the "synchronization pattern" parameter of the packet is correct (or correctly amended), there is no problem (problem has been solved) in the packet. Therefore, in step S206, the packet is output to the packet processing unit 18 (FIG. 5).

On the other hand, in a case where it has been determined in step S305 that the packet length calculation value and the packet length expected value are not equal to each other, the processing proceeds to step S307. In a case where it has been determined in step S304 that the synchronization pattern of the next packet is incorrect, the processing proceeds to step S307.

It is determined in step S307 that the "data length" parameter of the packet is incorrect, and the processing proceeds to step S308. In step S308, the "data length" parameter of the packet is corrected on the basis of the packet length expected value obtained in the processing in step S301 (FIG. 9).

After the "data length" parameter has been corrected, the processing proceeds to step S206 (FIG. 8). In this case, although there has been an error in the "data length" parameter, the error has been corrected. Therefore, it is assumed that there is no problem in the packet. The packet is output to the packet processing unit 18 (FIG. 5) in step S206.

In this way, the processing on the packet which continues from the previous block and ends in the block is performed. By performing the processing, even in a case where an error is included in the "data length" parameter, the error can be corrected, and the "data length" parameter can be corrected.

Figure 10:
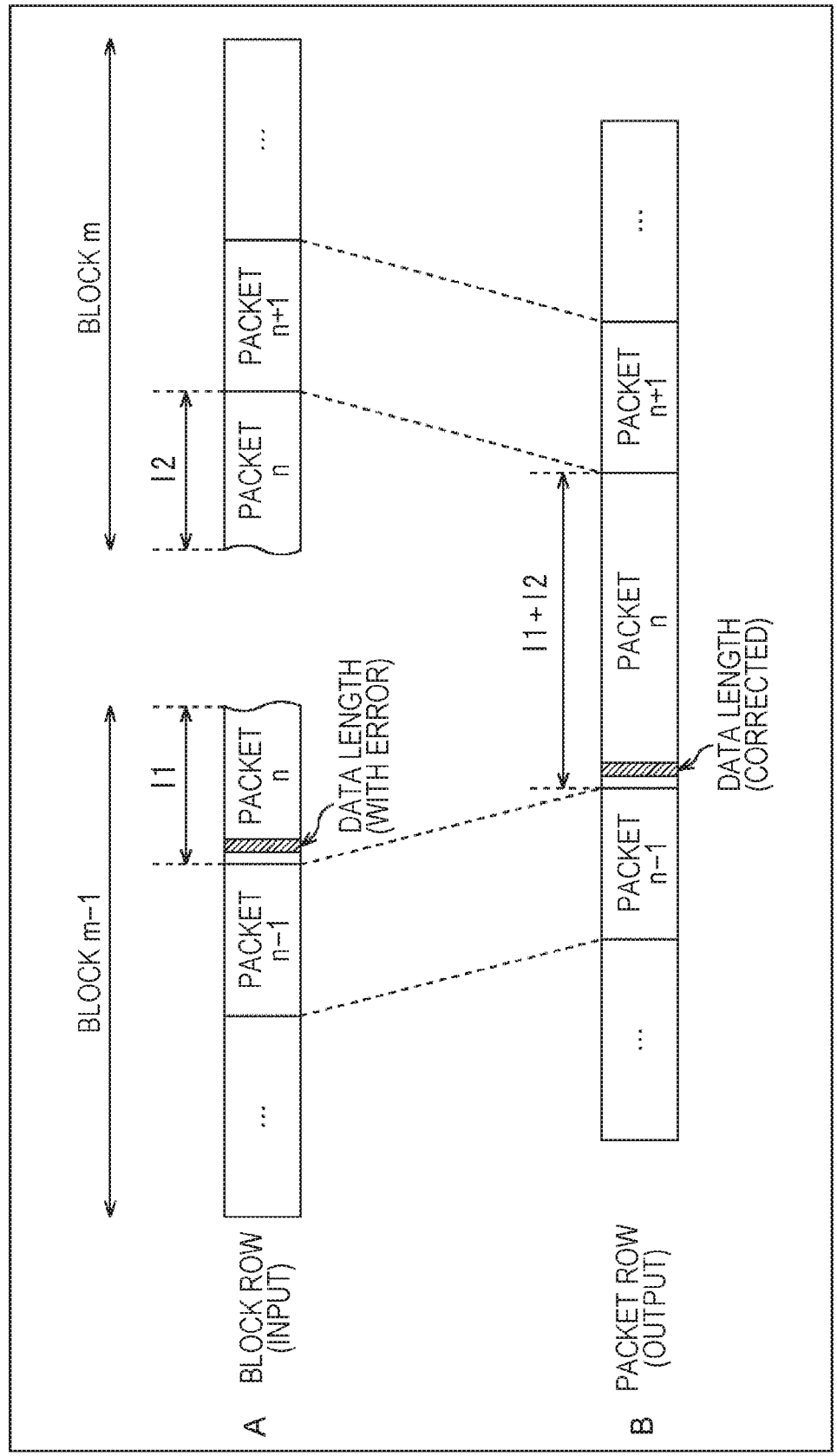
FIG. 10 is a diagram to describe the processing on the packet which continues from the previous block.

With reference to FIG. 10, the processing on the packet which continues from the previous block and ends in the block described with reference to FIGS. 8 and 9 will be described again. In FIG. 10, a case where a single packet straddles two blocks will be described as an example.

A of FIG. 10 is a diagram of an exemplary input (block row) to the block processing unit 17. In this example, two blocks (block m−1 and block m) are input to the block processing unit 17.

Here, in a case where a transmission error occurs in the "data length" parameter of the packet n which straddles the block m−1 and the block m, the processing described above is performed. The lengths of the packets n before and after the straddling parts are respectively l1 and l2, and the lengths can be calculated from the transmission parameters.

The length l1 of the packet n of the previous packet is obtained as the difference value between the block length (corresponding to BS in FIG. 7) and the last pointer (corresponding to LP of packet 0 to packet n−2 in FIG. 7), The length l2 of the packet n of the following packet is obtained as the top pointer (corresponding to TP of packet 0 in FIG. 7).

B of FIG. 10 illustrates an output (packet row) from the block processing unit 17 in a case where the block illustrated in A of FIG. 10 is assumed to be an input. As illustrated in B of FIG. 10, the "data length" parameter of the packet n has been corrected to a value obtained on the basis of the packet length (l1+l2) of the packet n.

In this way, in a case where an error has occurred in the "data length" parameter of the packet which straddles the blocks, the "data length" parameter is corrected by using the length of the packet which can be calculated from the transmission parameter. Then, since the "data length" parameter of the packet to be output is assumed as an corrected parameter, a failure in the processing due to the error of the "data length" parameter in the subsequent processing can be prevented.

Incidentally, it is possible to include processing relative to the subpacket in the processing described above. The description regarding a case where the processing is performed on the subpackets will be made later. For example, in a case where the processing is performed on the TLV packet, after the processing described above has been performed relative to the TLV packet, basically similar processing may be performed on a subpacket included in the TLV packet, for example, an IPv4 packet.

Even in a case where there is an error in a predetermined parameter (for example, "data length" parameter) of a subpacket, it is possible to correct the error by performing the similar processing for the subpacket.

In a case where the processing is also performed on subpackets, for example, the processing for the subpackets may be performed between steps S205 and S206 (FIG. 8).

The description returns to the flowchart illustrated in FIG. 6.

In a case where the processing on the packet which continues from the previous block and ends in the block has been performed in step S103 or in a case where it has been determined in step S102 that there is no packet which continues from the previous block and ends in the block, the processing proceeds to step S104.

In step S104, it is determined whether there is a packet (s) which is completed within the block (starts and ends in the block). For example, referring again to FIG. 3, the packet which is completed within the block is the packet n−1, the packet n, and the packet n+1 included in the block m. These packets start and end in the block m.

In a case where the reception processing unit 13 is configured to be able to handle the signal of the digital broadcast standard of Non-Patent Document 1, the top pointer and the last pointer included in the TMCC information can be used for the determination in step S104. That is, in a case where the top pointer is non-0 xFFFF and the last pointer is non-0 xFFFF, it can be determined that there is a packet which is completed within the block. Furthermore, in other cases, it can be determined that there is no packet which is completed within the block.

In a case where it has been determined in step S104 that there is the packet which is completed within the block, the processing proceeds to step S105. In step S105, the processing on the packet which is completed within the block is performed. The processing on the packet which is completed within the block performed in step S105 will be described with reference to the flowcharts in FIGS. 11 and 12.

It is determined in step S401 whether the error correction processing result of the block is correct. In a case where it has been determined in step S401 that the error correction processing result of the block is incorrect, the processing proceeds to step S402.

In step S402, a first packet is set as a packet to be processed, and the processing proceeds to step S403. In step S403, it is determined whether the "synchronization pattern" parameter of the packet is correct. An expected value of the "synchronization pattern" depends on the digital broadcast standard.

In a case where it has been determined in step S403 that the "synchronization pattern" parameter of the packet is correct, the processing in step S404 is skipped, and the processing proceeds to step S405.

On the other hand, in a case where it has been determined in step S403 that the "synchronization pattern" parameter of the packet is incorrect, the processing proceeds to step S404. In step S404, the "synchronization pattern" parameter of the packet is corrected, and the processing proceeds to step S405.

In step S405, the correcting processing of the "data length" parameter of the packet is performed. In the correcting processing of the "data length" parameter of the packet, in a case where an error is included in the "data length" parameter of the packet, the error is corrected, and in a case where an error is not included in the "data length" parameter of the packet, the parameter is output as it is.

The correcting processing of the "data length" parameter of the packet, which is performed in step S405, will be described with reference to the flowchart in FIG. 12.

In step S501, a packet length total sum expected value (including the packet) from the first packet to the final packet is calculated. In a case where the reception processing unit 13 is configured to be able to handle the signal of the digital broadcast standard of Non-Patent Document 1, the packet length total sum expected value can be calculated on the basis of the following formula.

Packet length total sum expected value=last pointer−top pointer

In FIG. 7, a portion (LP−TP) corresponds to the packet length total sum expected value.

When the packet length total sum expected value is calculated, the processing proceeds to step S502, and a packet length total sum from the first packet to the previous packet (not including the packet) is calculated. The packet length total sum is the total sum of the packet lengths calculated from the "data length" parameter of each packet regarding the packets from the first packet to the previous packet.

When the packet length total sum is calculated, the processing proceeds to step S503. The "data length" parameter of the packet is acquired, and the packet length is calculated. When the packet length is calculated, the processing proceeds to step S504, and it is determined whether there is a next packet. In a case where it has been determined in step S504 that there is the next packet, the processing proceeds to step S505.

In step S505, it is determined whether a synchronization pattern of the next packet is a correct value. In a case where it has been determined in step S505 that the synchronization pattern of the next packet is correct, the processing proceeds to step S506. In a case where it has been determined in step S504 that there is no next packet, the processing proceeds to step S506.

In step S506, the packet length obtained in the processing in step S503 is added to the packet length total sum obtained in step S502.

In step S507, it is determined whether the packet length total sum (assumed as packet length total sum calculated value) obtained by the processing in step S506 is equal to or less than the packet length total sum expected value obtained by the processing in step S501 (it is determined whether the packet length total sum calculated value≤ the packet length total sum expected value is satisfied).

In a case where it has been determined in step S507 that the packet length total sum calculated value≤the packet length total sum expected value is satisfied, the processing proceeds to step S508. In step S508, it is determined that the "data length" parameter of the packet is correct, and the processing proceeds to step S406 (FIG. 8).

Figure 12:
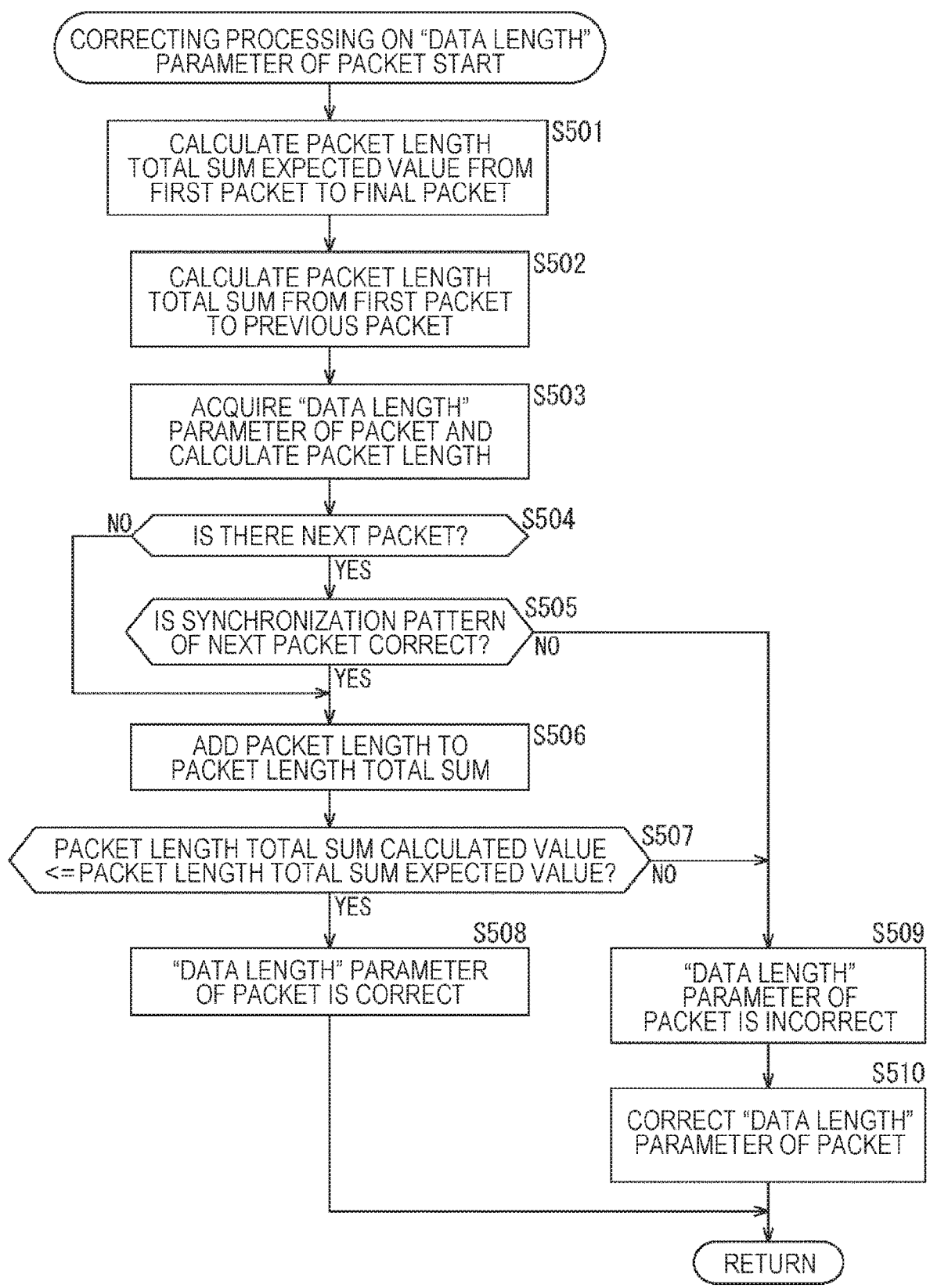
FIG. 12 is a flowchart to describe the correcting processing of the "data length" parameter of the packet.

Since this is a case where it has been determined that the "data length" of the packet is correct by performing the processing of the flowchart illustrated in FIG. 12 and it has been determined that the "synchronization pattern" parameter of the packet is correct (or correctly amended), there is no problem (has been solved) in the packet. Therefore, in step S406, the packet is output to the packet processing unit 18 (FIG. 5).

On the other hand, in a case where it has been determined in step S505 that the packet length total sum calculated value≤the packet length total sum expected value is not satisfied, the processing proceeds to step S509. In a case where it has been determined in step S505 that the synchronization pattern of the next packet is incorrect, the processing proceeds to step S509.

It is determined in step S509 that the "data length" parameter of the packet is incorrect, the processing proceeds to step S510. In step S510, the "data length" parameter of the packet is corrected on the basis of the packet length total sum expected value obtained in the processing in step S501.

In a case where the reception processing unit 13 is configured to be able to handle the signal of the digital broadcast standard of Non-Patent Document 1, the "data length" parameter (for correction) can be calculated as follows.

"Data length" parameter(for correction)=packet length(for correction)−4

Figure 13:
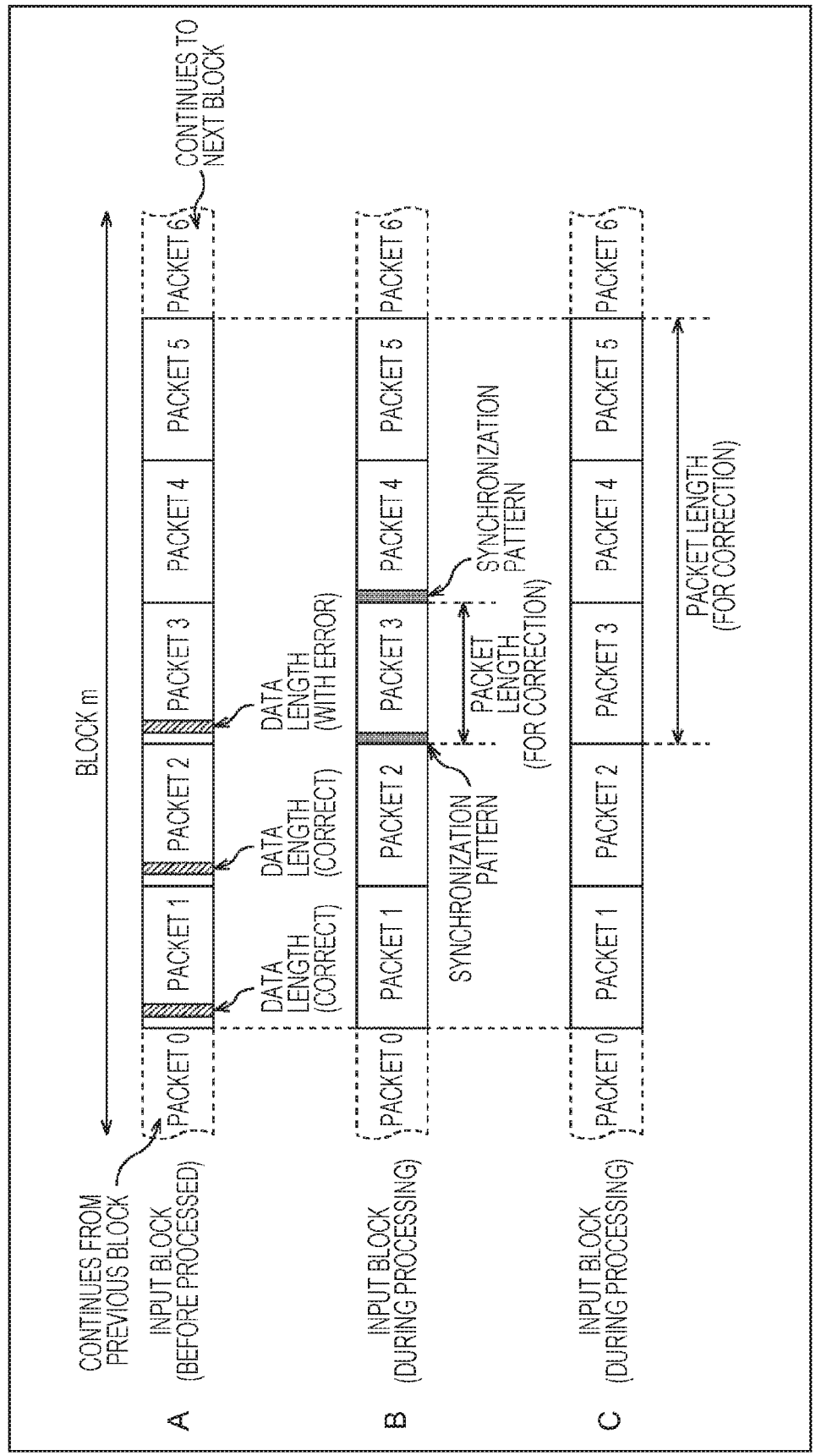
FIG. 13 is a diagram to describe a method of determining a packet length (for correction) of the packet.

Here, with reference to FIG. 13, a determination method of the packet length (for correction) will be described. A of FIG. 13 is a diagram of an exemplary input (block) to the block processing unit 17. In this example, five packets (packets 1 to 5) exist as packets which are completed within the block. Furthermore, it is assumed that the "data length" parameters of the packets 1 and 2 be correct and the "data length" parameter of the packet 3 be incorrect.

B of FIG. 13 is a diagram to describe a first determination method of the packet length when the block illustrated in A of FIG. 13 is an input. In the first method, a distance (byte) from a synchronization pattern of the packet (packet 3 in FIG. 13) to a next synchronization pattern (synchronization pattern of packet 4 in FIG. 13) is the packet length of the packet (for correction). However, in this example, it is assumed that no pattern having the same value as the "synchronization pattern" exist between the two "synchronization patterns" described above.

C of FIG. 13 is a diagram to describe a second determination method of the packet length when the block in A of FIG. 13 is an input. In the second method, a distance (byte) from the packet (packet 3 in FIG. 13) to the end of the packet which is completed within the block (final byte of packet 5 in FIG. 13) is the packet length of the packet (for correction).

The packet length (for correction) is determined by the first method or the second method, and the "data length" parameter (for correction) is calculated on the basis of the packet length.

After the "data length" parameter has been corrected, the processing proceeds to step S406 (FIG. 8). In this case, although there has been an error in the "data length" parameter, the error has been corrected. Therefore, it is assumed that there is no problem in the packet. The packet is output to the packet processing unit 18 (FIG. 5) in step S406.

In step S406, when the packet is output to the packet processing unit 18, the processing proceeds to step S407. It is determined in step S407 whether there is a next packet.

In a case where it has been determined in step S407 that there is a next packet, the processing proceeds to step S408, and the next packet is set to be a new packet to be processed. Then, the processing returns to step S403, and the subsequent processing is repeated.

Figure 11:
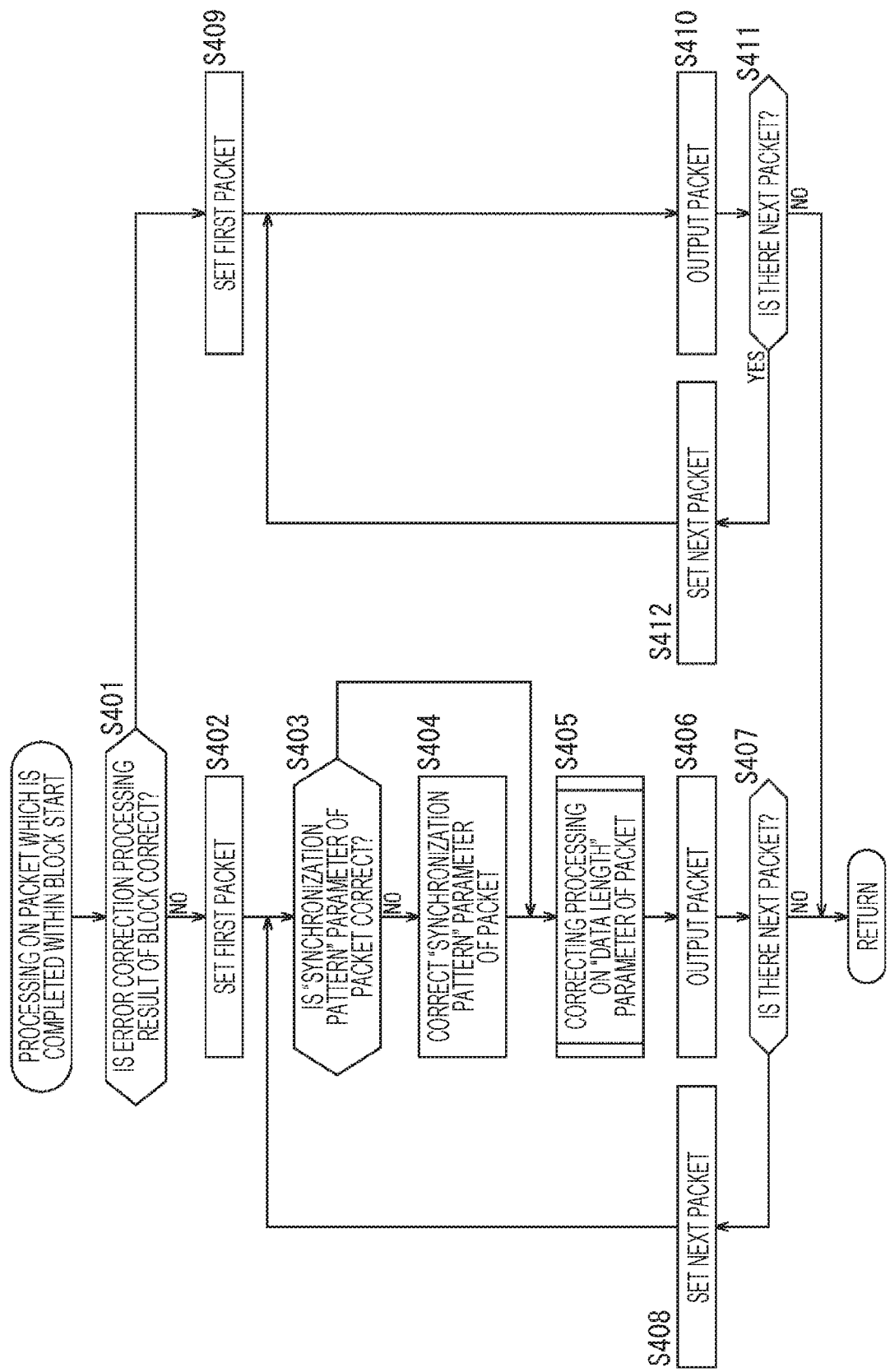
FIG. 11 is a flowchart to describe processing on the packet which is completed within the block.

On the other hand, in a case where it has been determined in step S407 that there is no next packet, the processing on the packet which is completed within the block illustrated in FIG. 11 ends.

On the other hand, in a case where it has been determined in step S401 that the error correction processing result of the block is correct, the processing proceeds to step S409. In step S409, the first packet is set as a packet to be processed, and the processing proceeds to step S410.

In step S410, the packet is output to the packet processing unit 18 (FIG. 5). After the output, the processing proceeds to step S411, and it is determined whether there is a next packet. In a case where it has been determined in step S411 that there is a next packet, the processing proceeds to step S412, and the next packet is set to be a new packet to be processed. Then, the processing returns to step S410, and the subsequent processing is repeated.

On the other hand, in a case where it has been determined in step S411 that there is no next packet, the processing on the packet which is completed within the block illustrated in FIG. 11 ends.

Since the error correction processing result of the block is OK in this case, the packets in the block are sequentially output by repeating the processing in steps S410 to S412.

Figure 14:
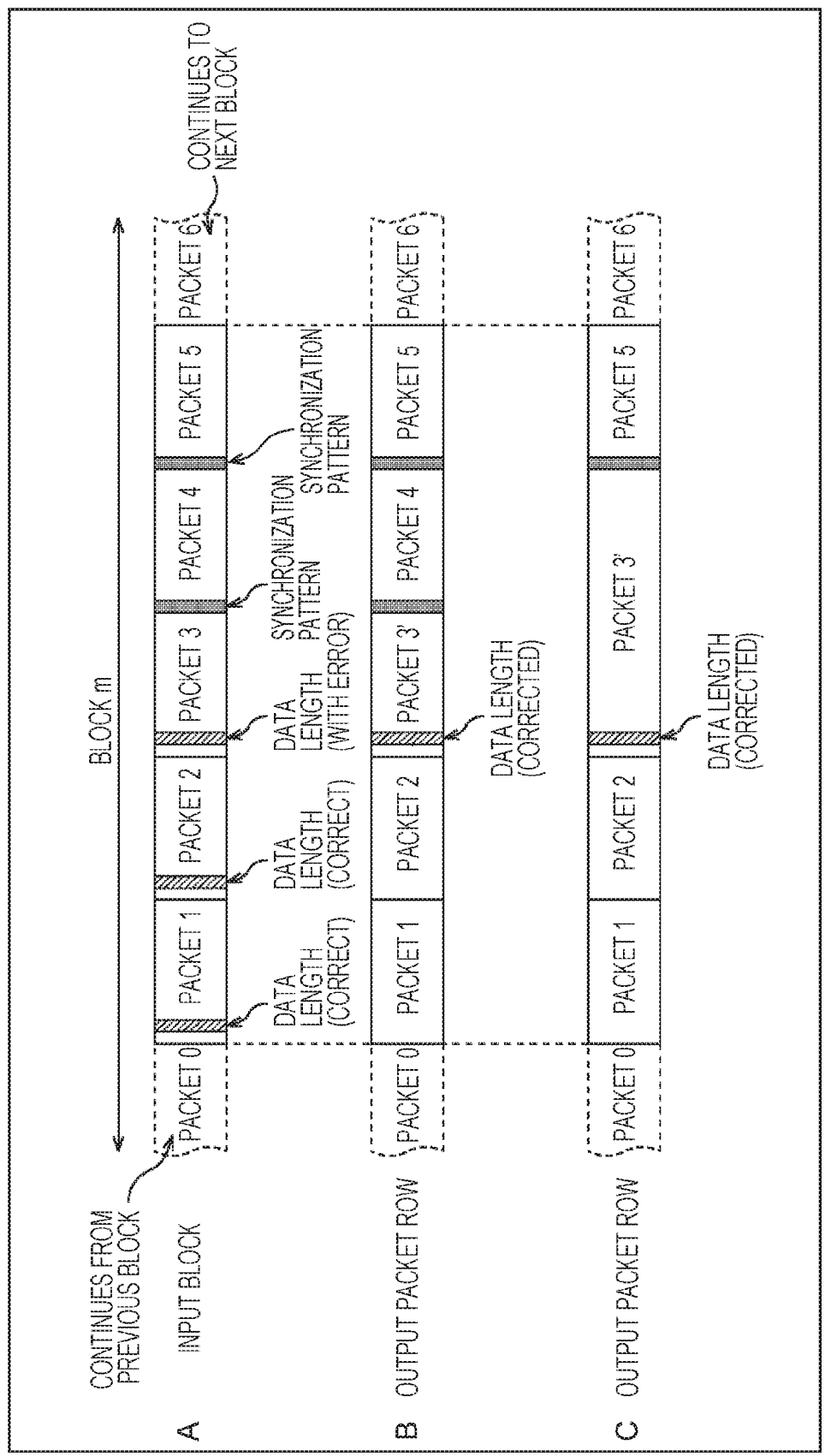
FIG. 14 is a diagram to describe processing on a packet which is completed within a single block.
Figure 15:
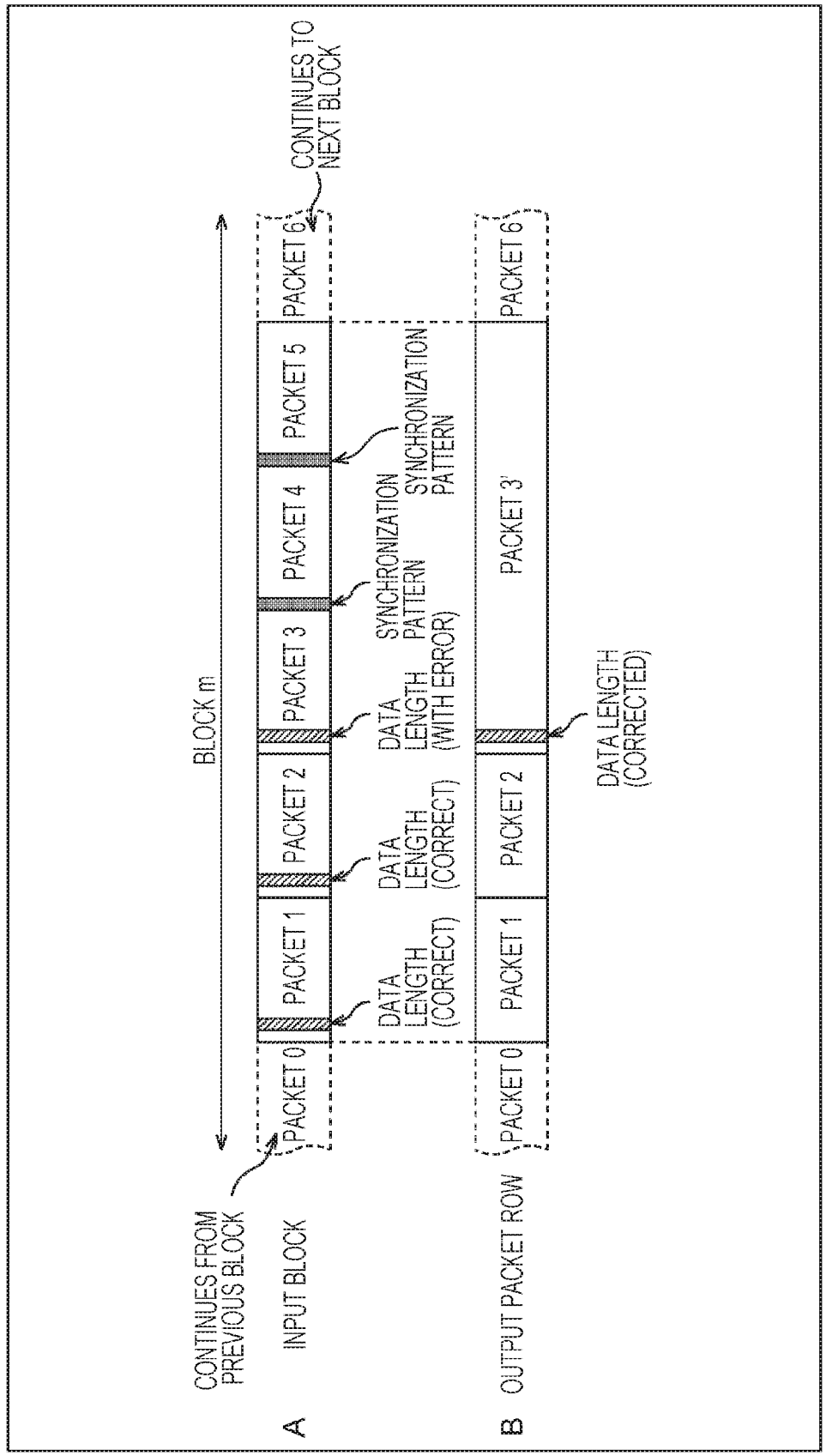
FIG. 15 is a diagram to describe processing on a packet which is completed within a single block.

With reference to FIGS. 14 and 15, the processing on the packets which are completed within the block described with reference to FIGS. 11 and 12 will be additionally described again.

FIG. 14A is a diagram to describe a case where the first determination method is used as a determination method of the packet length (for correction) described with reference to FIG. 13. A of FIG. 14 is a diagram of an exemplary input (block) to the block processing unit 17. In this example, five packets (packets 1 to 5) exist as packets which are completed within the block. Furthermore, it is assumed that the "data length" parameters of the packets 1 and 2 be correct and the "data length" parameter of the packet 3 be incorrect.

Both of B of FIG. 14 and C of FIG. 14 illustrate outputs (packet row) from the block processing unit 17 in a case where the block illustrated in A of FIG. 14 is input. B of FIG. 14 illustrates a case where a "synchronization pattern" parameter of the packet 4 in A of FIG. 14 is correct, and C of FIG. 14 illustrates a case where the "synchronization pattern" parameter of the packet 4 is incorrect (include transmission error).

In B of FIG. 14, a "data length" parameter of a packet 3' is corrected to a value based on the distance between the "synchronization patterns" of the packets 3 and 4. However, in this example, it is assumed that no pattern having the same value as the "synchronization pattern" exist between the two "synchronization patterns" described above.

In this case, a distance between the "synchronization patterns" of the packets 3 and 4 becomes a total length of a header portion and a data portion of the packet 3 (for example, refer to FIG. 2). In a case where the "data length" parameter is the total length of the header portion and the data portion, this length is used, and in a case where the "data length" parameter is the length of the data portion except for the header portion, the length obtained by subtracting the length of the header portion from this length is used. Since a length of a part to be described as the "data length" parameter is determined according to the type of the used packet, it is preferable that a value suitable for the type of the packet be calculated.

In C of FIG. 14, the "data length" parameter of the packet 3' is corrected to a value based on the distance between the "synchronization patterns" of the packets 3 and 5. However, in this example, it is assumed that no pattern having the same value as the "synchronization pattern" exist between the two "synchronization patterns" described above.

In this case, an error occurs in the "synchronization pattern" of the packet 4, when a data length of the packet 3 is calculated by using the "synchronization patterns" of the packets 3 and 4, it is possible that the calculated value has an error. Therefore, the "synchronization pattern" of the next packet 5 is used without using the "synchronization pattern" of the packet 4.

The new packet 3' is a packet in which the packets 3 and 4 are combined, and it is assumed that a data length of the packet 3' be a distance from the "synchronization pattern" of the packet 3 to the "synchronization pattern" of the packet 5. Furthermore, in this case, similar to a case described with reference to B of FIG. 14, the data length suitable for the type of the packet is calculated.

FIG. 15 is a diagram to describe a case where the second determination method is used as a determination method of the packet length (for correction) described with reference to FIGS. 13A to 13C. A of FIG. 15 is a diagram of an example of an input (block) to the block processing unit 17 as in A of FIG. 14.

B of FIG. 15 is a diagram of an output (packet row) from the block processing unit 17 in a case where the block in A of FIG. 15 has been input. As it can be understood from B of FIG. 15, the packet 3' is formed by including the packets 3 to 5 and formed as a single packet, and the "data length" parameter is determined on the basis of the packet length of the packet 3'.

In this case, the packet 5 is the final packet of the packets which are completed within the block m. Therefore, it is assumed that a distance from the packet 3 to the packet 5 (final byte of packet 5) be the data length of the new packet 3'. The new packet 3' is a packet in which the packets 3, 4, and 5 are combined. Furthermore, in this case, similar to a case described with reference to B of FIG. 14, the data length suitable for the type of the packet is calculated.

With reference to the flowcharts in FIGS. 16 and 17, a modification of the processing on the packet(s) which is completed within the block performed in step S105 (FIG. 6) (assumed to be second processing on the packet which is completed within the block) will be described.

In the processing on the packet which is completed within the block described with reference to FIGS. 11 and 12, the "data length" parameter is inspected for each packet. Whereas, in the second processing on the packet which is completed within the block described with reference to FIGS. 16 and 17, "data length" parameters of all the packets are inspected. This point is different between the above processing and the second processing. Furthermore, in a case where the "data length" parameter is incorrect, all the packets which are completed within the block are output as a single packet. This point is also different between the two processing.

In step S601, the error correction processing result of the block is confirmed, and it is determined whether the error correction processing results is correct. In a case where it has been determined in step S601 that the error correction processing result of the block is incorrect, the processing proceeds to step S602.

In step S602, parameter correctness determining processing is performed. With reference to the flowchart in FIG. 17, the parameter correctness determining processing performed in step S602 will be described.

In step S701, the first packet is set as a packet to be processed. It is determined in step S702 whether the "synchronization pattern" parameter of the packet is correct. In a case where it has been determined in step S702 that the "synchronization pattern" parameter of the packet is correct, the processing proceeds to step S703.

In step S703, the "data length" parameter correctness determining processing is performed. The "data length" parameter correctness determining processing performed in step S703 will be described with reference to the flowchart in FIG. 18.

Figure 18:
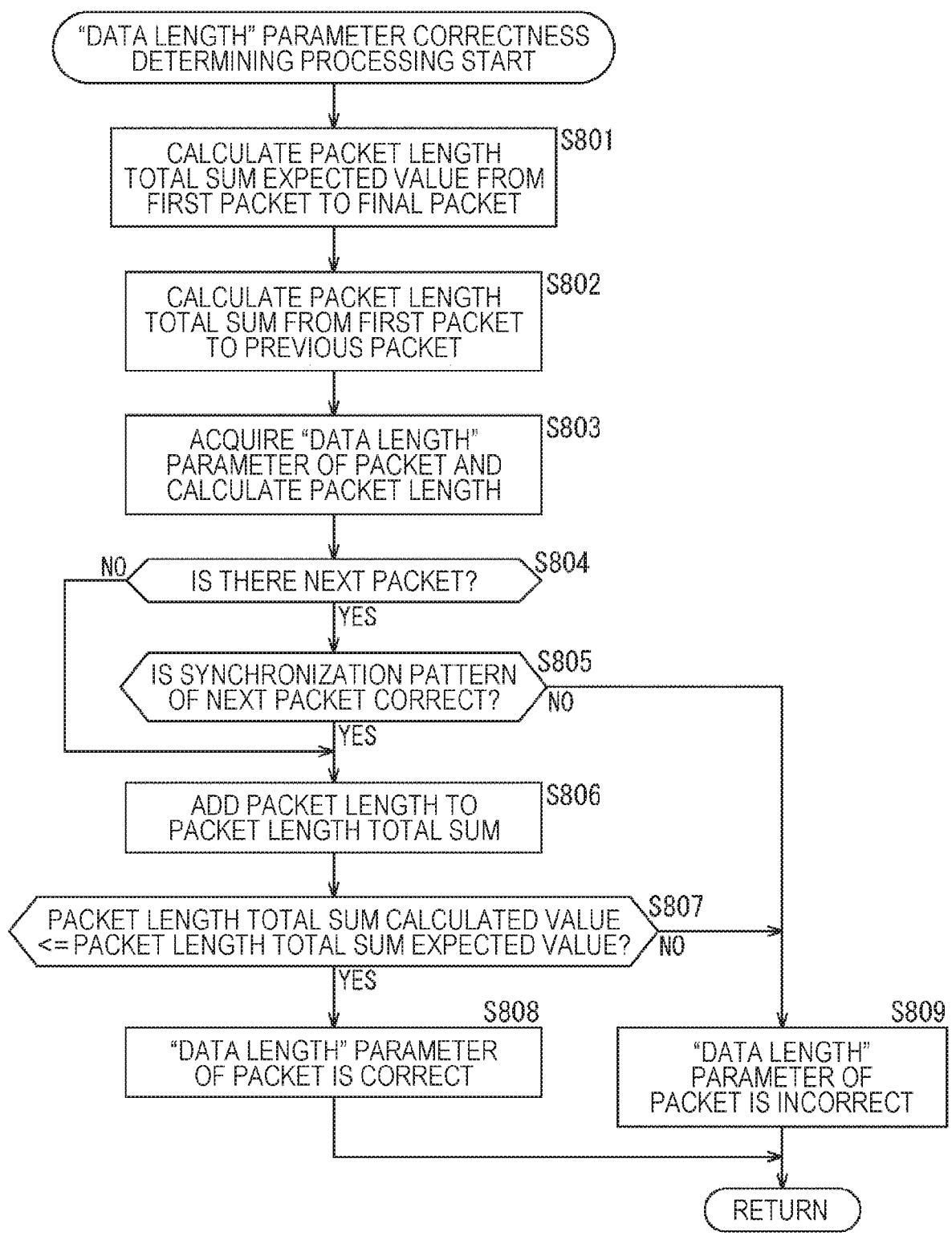
FIG. 18 is a flowchart to describe "data length" parameter correctness determining processing.

In the flowchart illustrated in FIG. 18, processing in steps S801 to S809 is similar to the processing in steps S501 to S509 in the flowchart illustrated in FIG. 12. In other words, the processing based on the flowchart illustrated in FIG. 18 is processing in which the processing in step S510 for correcting the "data length" parameter is omitted from the processing based on the flowchart illustrated in FIG. 12.

In the processing based on the flowchart illustrated in FIG. 12, in a case where the "data length" parameter of the packet to be processed has been incorrect, the packet has been corrected and output. However, in the processing based on the flowchart illustrated in FIG. 18, the processing proceeds to next processing without correcting the "data length" parameter. As described above, first, the "data length" parameters of all the packets are inspected. In a case where an error is included in the "data length" parameter, individual packets are not corrected because the errors are collectively corrected in the following processing (processing corresponding to step S510 is not performed).

Figure 17:
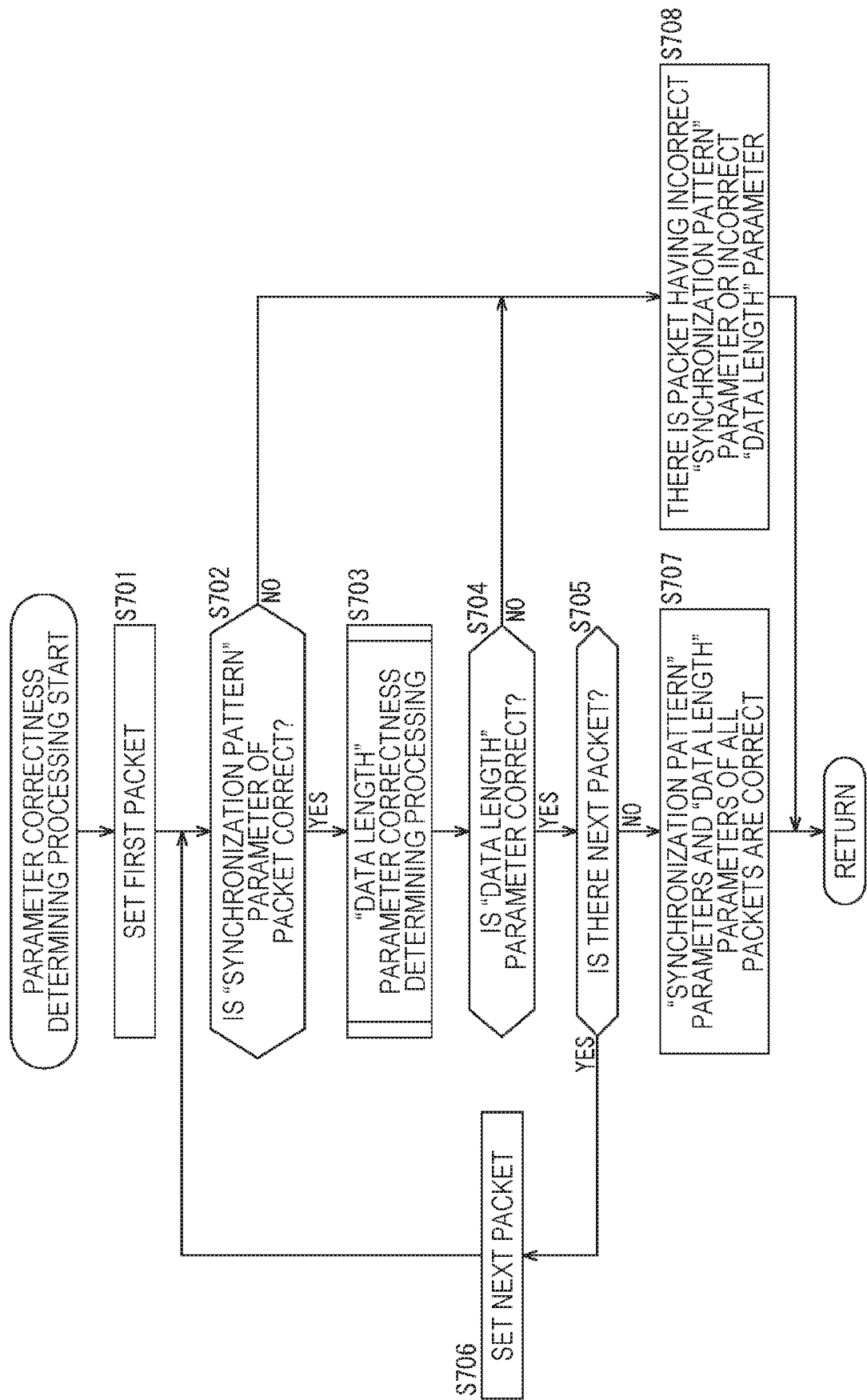
FIG. 17 is a flowchart to describe parameter correctness determining processing.

The description returns to the flowchart in FIG. 17. In step S703, the "data length" parameter correctness determining processing is performed. When the determination result is obtained, the processing proceeds to step S704. In step S704, whether the "data length" parameter is correct is determined by referring to the determination result in step S703.

In a case where it has been determined in step S704 that the "data length" parameter is correct, the processing proceeds to step S705, and it is determined whether there is a next packet. In a case where it has been determined in step S705 that there is a next packet, the processing proceeds to step S706, and the next packet is set to be a new packet to be processed. Then, the processing returns to step S702, and the subsequent processing is repeated.

On the other hand, in a case where it has been determined in step S705 that there is no next packet, the processing proceeds to step S707. In step S707, a determination result indicating that the "synchronization pattern" parameters and the "data length" parameters of all packets are correct is obtained, and the processing proceeds to step S603 (FIG. 16).

On the other hand, in a case where it has been determined in step 702 that the "synchronization pattern" parameter of the packet is incorrect or in a case where it has been determined in step S704 that the "data length" parameter is incorrect, the processing proceeds to step S708.

Figure 16:
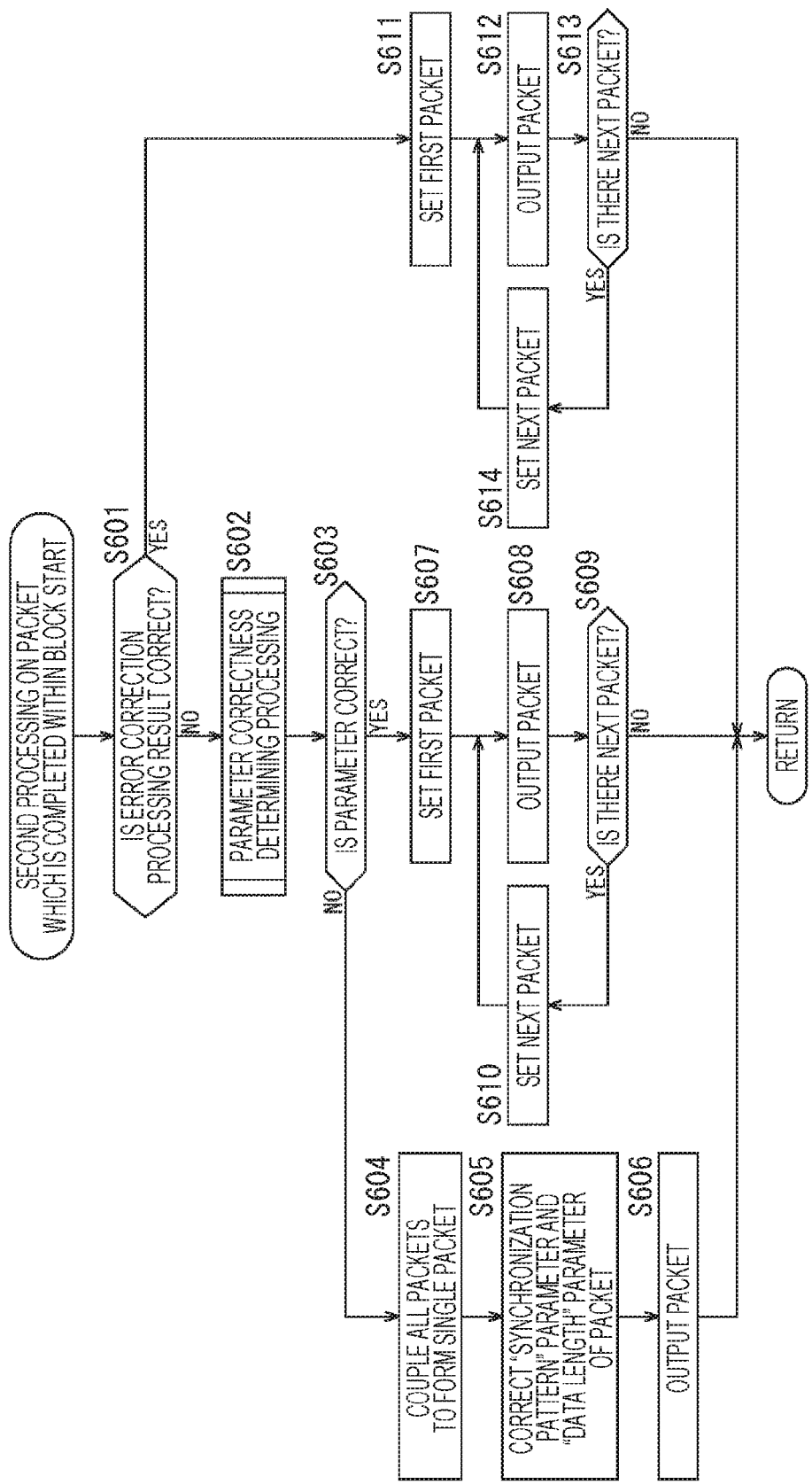
FIG. 16 is a flowchart to describe second processing of a packet which is completed within the block.

In step S708, a determination result indicating that there is a packet having the incorrect "synchronization pattern" parameter or the incorrect "data length" parameter is obtained, and processing proceeds to step S603 (FIG. 16). That is, in a case where a failure has been detected in the "synchronization pattern" parameter or the "data length" parameter in the packet in the block to be processed, the processing is shifted to processing for correction at that time since the parameter in the block is incorrect.

In step S603, it is determined whether the parameter is correct by referring to the determination result obtained by the processing in step S602. In a case where it has been determined in step S603 that the parameter is incorrect, the processing proceeds to step S604.

In step S604, all the packets are coupled to each other to form a single packet. In step S605, the "data length" parameter of the packet is corrected. In this case, the "data length" parameter is corrected to the data length of the single packet which has been formed. Then, in step S606, the packet is output to the packet processing unit 18, and the second processing on the packet which is completed within the block illustrated in FIG. 16 ends.

In this way, the "data length" parameters of all the packets are inspected, and in a case where the parameters are incorrect, all the packets which are completed within the block are formed as a single packet. Then, the "data length" parameter is corrected to the data length of the single packet and is output.

On the other hand, in a case where it has been determined in step S603 that the parameter is correct, the processing proceeds to step S607, and the first packet is set as a packet to be processed.

Processing in step S608 is performed on the set packet. In step S608, the packet is output to the packet processing unit 18. After that, the processing proceeds to step S609. It is determined in step S609 whether there is a next packet.

In a case where it has been determined in step S609 that there is a next packet, the processing proceeds to step S610, and the next packet is set to be a new packet to be processed. Then, the processing returns to step S608, and the subsequent processing is repeated.

On the other hand, in a case where it has been determined in step S609 that there is no next packet, the second processing on the packet which is completed within the block illustrated in FIG. 16 ends. That is, in this case, since the parameter is correct, by repeating the processing in steps S608 to S610, the packets in the block to be processed are sequentially output to the packet processing unit 18.

On the other hand, in a case where it has been determined in step S601 that the error correction processing result of the block is correct, the processing proceeds to step S611. In step S611, the first packet is set as a packet to be processed.

Processing in step S612 is performed on the set packet. In step S612, the packet is output to the packet processing unit 18. After that, the processing proceeds to step S613. It is determined in step S613 whether there is a next packet.

In a case where it has been determined in step S613 that there is a next packet, the processing proceeds to step S614, and the next packet is set to be a new packet to be processed. Then, the processing returns to step S612, and the subsequent processing is repeated. That is, in this case, since the error correction processing result of the block is correct, by repeating the processing in steps S612 to S614, the packets in the block to be processed are sequentially output to the packet processing unit 18.

Figure 19:
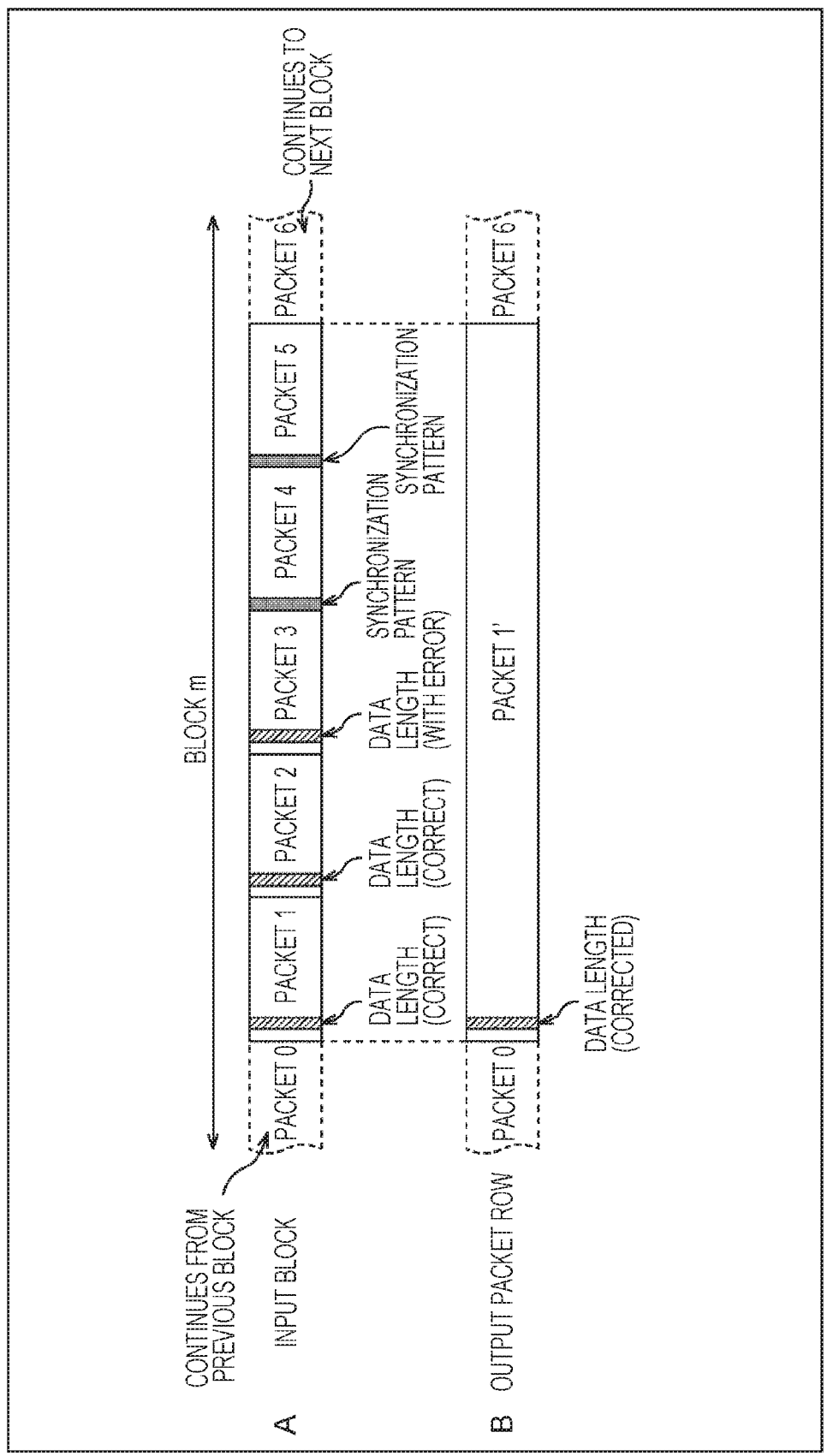
FIG. 19 is a diagram to describe other processing of a packet which is completed within a single block.

With reference to FIG. 19, the second processing on the packets which are completed within the block described with reference to FIGS. 16 to 18 will be additionally described again.

A of FIG. 19 is a diagram of an exemplary input (block) to the block processing unit 17. In this example, five packets (packets 1 to 5) exist as packets which are completed within the block. Furthermore, it is assumed that the "data length" parameters of the packets 1 and 2 be correct and the "data length" parameter of the packet 3 be incorrect.

B of FIG. 19 is a diagram of an output (packet row) from the block processing unit 17 in a case where the block in A of FIG. 19 has been input. As it can be understood from B of FIG. 19, a packet 1' is formed by including the packets 1 to 5 and formed as a single packet, and a "data length" parameter is determined (corrected) on the basis of the packet length.

In this way, the second processing on the packet which is completed within the block is performed.

Incidentally, it is possible to include processing relative to the subpacket in the processing described above. A case where the processing is performed on the subpacket will be described later. For example, in a case where the TLV packet is processed, after the processing is performed on the TLV packet, the similar processing may be performed on the subpacket included in the TLV packet, such as, an IPv4 packet.

Even in a case where there is an error in a predetermined parameter (for example, "data length" parameter) of a subpacket, it is possible to correct the error by performing the similar processing for the subpacket.

In a case where the processing is also performed on the subpacket, for example, the processing on the subpacket can be performed between steps S607 and S608 (FIG. 16).

The description returns to the flowchart in FIG. 6.

In a case where it has been determined in step S104 that there is no packet which is completed within the block, or in a case where the processing on the packet which is completed within the block has ended in step S105, the processing proceeds to step S106.

It is determined in step S106 whether there is a packet which starts in the block and continues to the next block.

Referring again to FIG. 3, for example, in a case where the block m is to be processed, the packet n+2 is a packet which starts in the block m and continues to the next block m+1. Therefore, in a case where a block such as the block m is to be processed, it is determined in step S106 that there is a packet which continues from the previous block and ends in the block, and the processing proceeds to step S107.

In a case where the reception processing unit 13 is configured to be able to handle the signal of the digital broadcast standard of Non-Patent Document 1, the last pointer included in the TMCC information can be used to determine in step S106 whether there is a packet which starts in the block and continues to the next block. That is, in a case where the last pointer is non-0 xFFFF, it can be determined that there is a packet which continues to the next block, and in other cases, it can be determined that there is no packet which continues to the next block.

Figure 20:
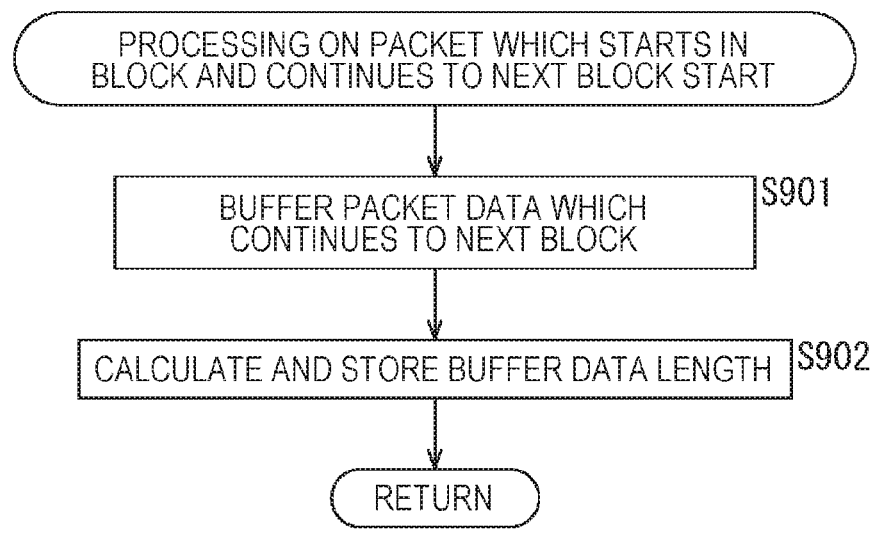
FIG. 20 is a flowchart to describe processing on a packet which starts in the block and continues to a next block.

In a case where it has been determined in step S106 that there is a packet which starts in the block and continues to the next block, the processing proceeds to step S107. In step S107, processing on the packet which starts in the block and continues to the next block is performed. With reference to the flowchart illustrated in FIG. 20, the processing on the packet which starts in the block and continues to the next block performed in step S107 will be described.

In step S901, packet data which continues to the next block is buffered. For example, in the above example, data of the packet n+2 of the block m is buffered.

In step S902, a buffer data length is calculated, and the obtained result is stored. In a case where the reception processing unit 13 is configured to be able to handle the signal of the digital broadcast standard of Non-Patent Document 1, the "buffer data length" can be obtained by the following formula.

Buffer data length=main signal length of slot−last pointer

In this way, the packet which starts in the block and continues to the next block is buffered, and the buffer data length is calculated, and processing of the above packet together with a packet included in the next block is prepared. When such preparation is made, the processing of the flowchart illustrated in FIG. 20 ends. Furthermore, since the processing relative to the block has ended, the processing of the flowchart illustrated in FIG. 6 ends, and the processing is shifted to the processing on the next block.

The description returns to the processing of the flowchart illustrated in FIG. 6.

In a case where it has been determined in S101 that the packet does not start and end in the block in the determination whether the packet starts or ends in the block, in other words, in a case where it has been determined that there is a packet which continues from the previous block and continues to the next block, the processing proceeds to step S108.

Referring again to FIG. 3, for example, in a case where the block m+1 is to be processed, the packet n+2 continues from the previous block m and continues to the next block m+2 (not shown). Therefore, in a case where a block such as the block m+1 is to be processed, it is determined in step S101 that there is a packet which continues from the previous block and continues to the next block, and the processing proceeds to step S108.

In a case where the reception processing unit 13 is configured to be able to handle the signal of the digital broadcast standard of Non-Patent Document 1, the top pointer and the last pointer included in the TMCC information can be used for the determination in step S101. That is, in a case where the top pointer is non-0 xFFFF and the last pointer is not non-0 xFFFF, it can be determined that there is a packet which continues from the previous block and continues to the next block.

Figure 21:
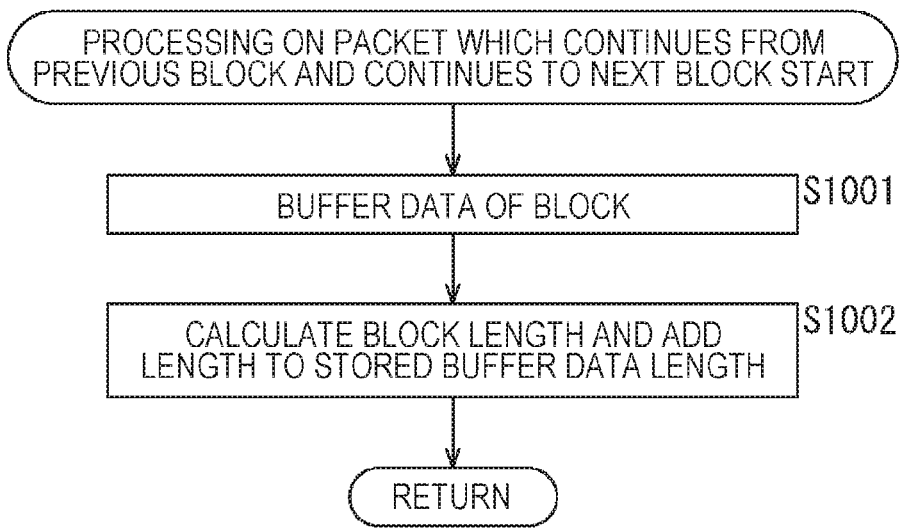
FIG. 21 is a flowchart to describe processing on a packet which continues from the previous block and continues to the next block.

In step S108, the processing on the packet which continues from the previous block and continues to the next block is performed. The processing on the packet which continues from the previous block and continues to the next block performed in step S108 will be described with reference to the flowchart in FIG. 21.

In step S1001, data of the block is buffered. In step S1002, a block length of the block is calculated, and the calculated block length is added to the stored buffer data length. After that, the obtained result is stored.

In this way, the packet which continues from the previous block and continues to the next block is buffered, and a value obtained by adding the block length and the buffer data length is calculated. Preparation for the processing on the above packet together with the packet included in the next block is made. When such preparation is made, the processing of the flowchart illustrated in FIG. 20 ends. Furthermore, since the processing relative to the block has ended, the processing of the flowchart illustrated in FIG. 6 ends, and the processing is shifted to the processing on the next block.

Figure 22:
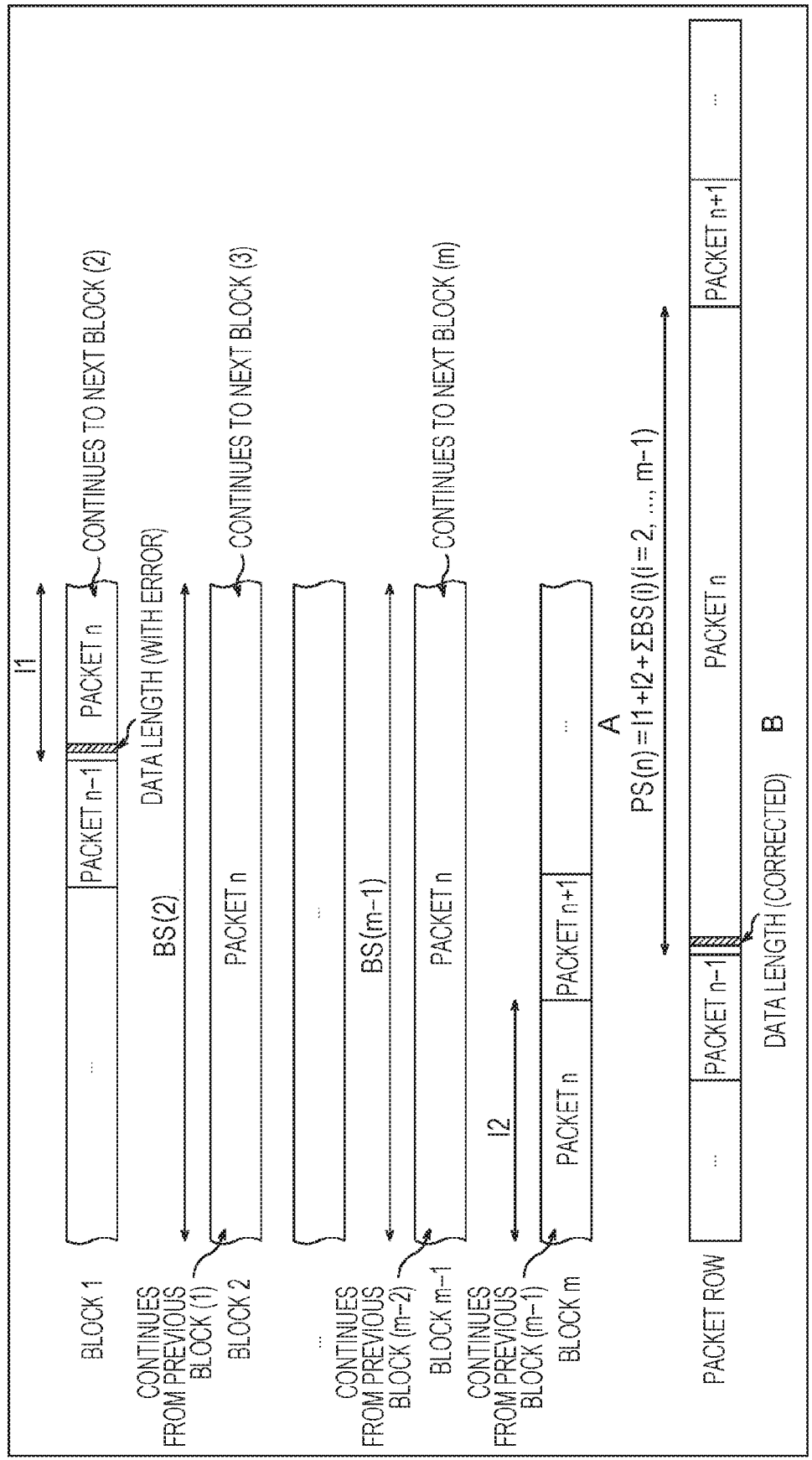
FIG. 22 is a diagram to describe processing in a case where a single packet straddles a plurality of blocks.

With reference to FIG. 22, the processing on the packet which continues from the previous block and continues to the next block performed in step S108 (processing in a case where single packet straddles a plurality of blocks) will be additionally described again.

A of FIG. 22 is a diagram of an exemplary input (block row) to the block processing unit 17. In this example, m blocks (from block 1 to block m) are sequentially input to the block processing unit 17. It is assumed that a transmission error occur in a "data length" parameter of a packet (packet n) straddling these blocks.

Furthermore, the lengths of the packets before and after the straddling parts are respectively l1 and l2, and the lengths can be calculated from the transmission parameters as described above. Furthermore, the block lengths from the block 2 to the block m−1 are respectively, BS (2), . . . , and BS (m−1). In a case where the reception processing unit 13 is configured to be able to handle the signal of the digital broadcast standard of Non-Patent Document 1, these values can be calculated from the transmission parameter (main signal length of slot, refer to FIG. 7) as described above.

B of FIG. 22 is a diagram of an output (packet row) from the block processing unit 17 in a case where A of FIG. 22 illustrates the input. As it can be understood from B of FIG. 22, the "data length" parameter of the packet n is obtained by the following formula.

Packet length of packet $n$ $PS(n)=(l1+l2+\Sigma BS(i))$
($i=2, \ldots, m-1$)

The "data length" parameter of the packet n is corrected to a value calculated on the basis of such calculation.

As described above, according to the present technology, even in a case where the "data length" parameter includes an error, the "data length" parameter can be corrected. Thus, the situations can be prevented such that the "data length" parameter includes an error, a correct position of the head of the next packet is not found, and the processing fails, for example, since the packet cannot be correctly invalidated.

<Processing on Subpacket>

In the processing by the block processing unit 17 described above, the processing described above may be performed on the subpacket. Here, the subpacket will be described with reference to FIG. 23.

Figure 23:
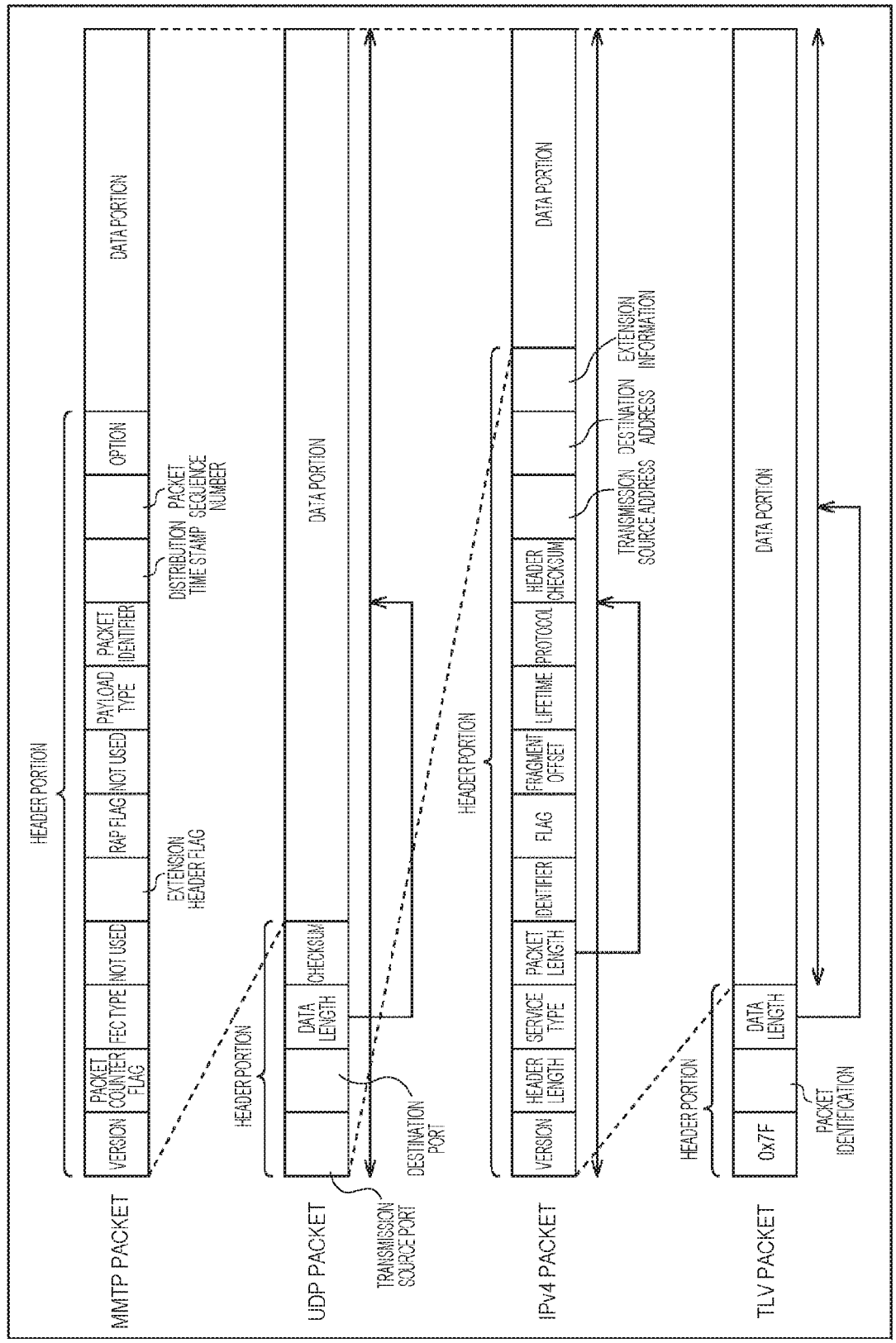
FIG. 23 is a diagram to describe a structure of a TLV packet.

In a case where the reception processing unit 13 is configured to be able to handle the TLV packets, the TLV packet has a configuration as illustrated in FIG. 23. As illustrated in the lowermost part of FIG. 23, the TLV packet includes a header portion and a data portion, and the header portion includes a "synchronization" parameter, a "packet identifier" parameter, and a "data length" parameter.

In the processing by the block processing unit 17, the "synchronization" parameter is a parameter included in the header portion of the TLV packet. Furthermore, in the processing by the block processing unit 17, the "data length" parameter is a parameter included in the header portion of the TLV packet. In a case where there is an error in the "synchronization" parameter and the "data length" parameter, the error is corrected by performing the processing described above.

In the "data length" parameter included in the header portion of the TLV packet, a length of the data portion of the TLV packet is described. A type of the packet included in the data portion is described in the "packet identifier" of the header portion.

The data portion of the TLV packet includes any one of an IPv4 packet, an IPv6 packet, a compressed IP packet, a null packet, and other packet. In the example illustrated in FIG. 23, the IPv4 packet is included in the data portion of the TLV packet. The IPv4 packet includes a header portion and a data portion.

The header portion of the IPv4 packet includes parameters such as "version", "header length", "service type", "packet length", "identifier", "flag", "fragment offset", "lifetime", "protocol", "header checksum", "transmission source address", "destination address", and "extension information".

In the "packet length" parameter included in the header portion of the IPv4 packet, the length including the lengths the header portion and data portion of the IPv4 packet is described. In a case where the block processing unit 17 performs processing relative to the IPv4 packet (subpacket), the processing can be performed as assuming that the "packet length" parameter corresponds to the "data length" parameter.

The data portion of the IPv4 packet includes, for example, a UDP packet as illustrated in FIG. 23. The UDP packet also includes a header portion and a data portion.

The header portion of the UDP packet includes parameters such as the "transmission source port", the "destination port", the "data length", and "checksum". In the "data length" parameter included in the header portion of the UDP packet, the length including the lengths of the header portion and the data portion of the UDP packet is described.

The data portion of the UDP packet includes, for example, a MMTP packet as illustrated in FIG. 23. The MMTP packet also includes a header portion and a data portion.

In the header portion of the MMTP packet, parameters such as "version", "packet counter flag", "FFC type", "extension header flag", "RAP flag", "payload type", "packet identifier", "distribution time stamp", "packet sequence number", and "option" are provided.

Since the TLV packet has such a configuration, the processing described above may be performed on only the TLV packet, and processing to the subpacket to be described later may be performed on the subpacket included in the TLV packet, for example, the IPv4 packet.

Furthermore, the subpacket may be any one of the IPv4 packet, the UDP packet, and the MMTP packet, and the processing relative to the subpacket to be described later may be performed on one of the packets as a subpacket. The processing relative to the subpacket to be described later may be performed on each subpacket of all the above packets as the subpackets.

Figure 24:
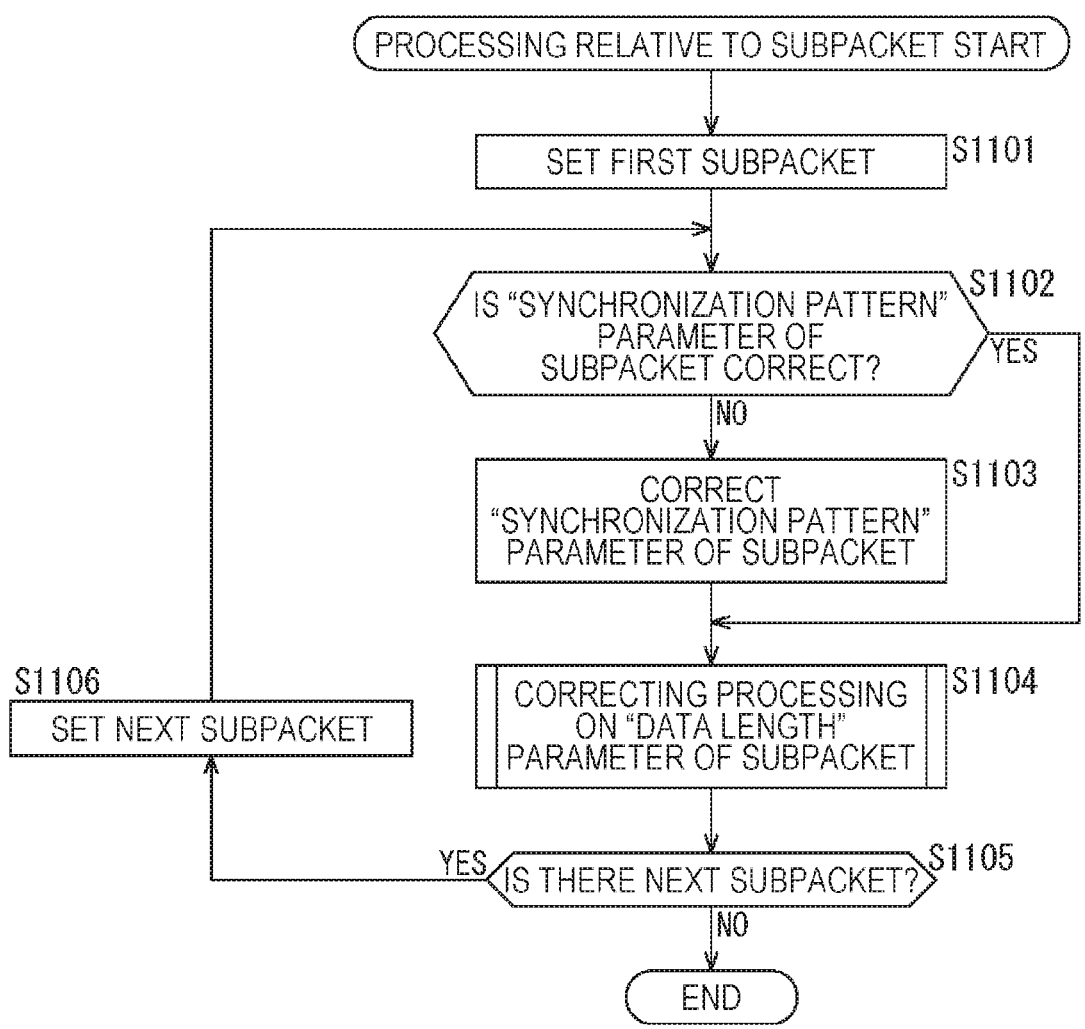
FIG. 24 is a flowchart to describe processing to subpackets.
Figure 25:
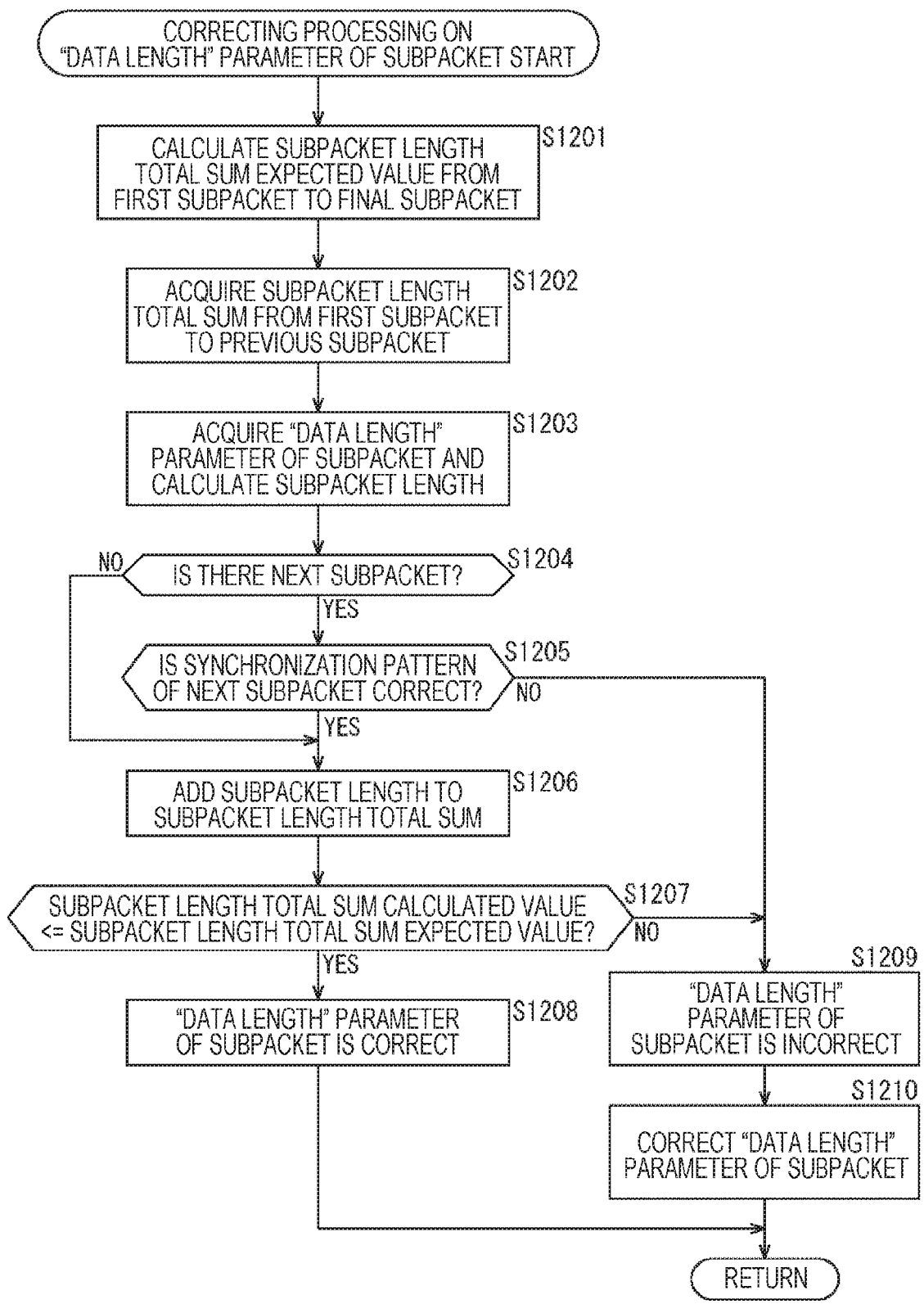
FIG. 25 is a flowchart to describe correcting processing of a "data length" parameter of the subpacket.

With reference to the flowcharts in FIGS. 24 and 25, the processing relative to the subpacket will be described. Note that the processing to be described with reference to FIGS. 24 and 25 is performed, for example, between steps S205 and S206 in the flowchart illustrated in FIG. 8. Furthermore, for example, the processing is performed between steps S405 and S406 in the flowchart illustrated in FIG. 11. Furthermore, for example, the processing is performed between steps S607 and S608 in the flowchart illustrated in FIG. 16.

In step S1101, a first subpacket is set as a packet to be processed, and the processing proceeds to step S1102. In step S1102, it is determined whether the "synchronization pattern" parameter of the subpacket is correct. An expected value of the "synchronization pattern" depends on the digital broadcast standard.

In a case where it has been determined in step S1102 that the "synchronization pattern" parameter of the subpacket is correct, the processing in step S1103 is skipped, and the processing proceeds to step S1104.

On the other hand, in a case where it has been determined in step S1102 that the "synchronization pattern" parameter of the subpacket is incorrect, the processing proceeds to step S1103. In step S1103, the "synchronization pattern" parameter of the subpacket is corrected.

Furthermore, in a case where the subpacket to be processed is an IP packet such as the IPv4 packet and the IPv6 packet, the "synchronization pattern" parameter can be, for example, the "version" parameter (four bits) included in the header portion of the IP packet. In this way, in a case where the subpacket is processed, the parameter corresponding to the "synchronization pattern" parameter is used and the processing is performed according to the subpacket.

In step S1104, correcting processing of the "data length" parameter of the subpacket is performed. In the correcting processing of the "data length" parameter of the subpacket, in a case where an error is included in the "data length" parameter of the subpacket, the error is corrected, and in a case where an error is not included in the "data length" parameter of the subpacket, the parameter is output as it is.

The correcting processing of the "data length" parameter of the subpacket, which is performed in step S1104, will be described with reference to the flowchart in FIG. 25.

Furthermore, in a case where the subpacket to be processed is an IP packet such as the IPv4 packet and the IPv6 packet, the "data length" parameter can be, for example, the "packet length" parameter (FIG. 23) included in the header portion of the IP packet. In this way, in a case where the subpacket is processed, the parameter corresponding to the "data length" parameter is used and the processing is performed according to the subpacket.

Here, the description will continue as using the "data length" parameter. However, the parameters according to the type of the packet to be processed such as the "packet length" parameter are to be processed.

FIG. 25 is a flowchart to describe correcting processing on the "data length" parameter of the subpacket performed in step S1104. Processing in steps S1201 to S1210 in the flowchart illustrated in FIG. 25 are basically similar to the processing in steps S501 to S510 in the flowchart of the correcting processing on the "data length" parameter of the packet illustrated in FIG. 12.

Since the processing is performed on the subpacket, by performing the processing in steps S501 to S510 in the flowchart illustrated in FIG. 12 on the subpacket (packet in processing in steps S501 to S510 in flowchart illustrated in FIG. 12 is replaced with subpacket), the processing in steps S1201 to S1210 in the flowchart illustrated in FIG. 25 can be performed. Therefore, the description regarding the processing is omitted here.

Note that the processing in step S1104 may be performed as follows, instead of being performed on the basis of the processing in the flowchart illustrated in FIG. 25.

Referring again to FIG. 23, a single IP packet (for example, IPv4 packet) is included in the TLV packet. Furthermore, the length of the data portion of the TLV packet corresponds to (equivalent to) the length of the IP packet. Therefore, by determining whether the length of the data portion of the TLV packet is equal to the entire length of the IP packet, it can be determined whether the "packet length" parameter corresponding to the "data length" parameter of the IP packet is correct.

The length of the data portion of the TLV packet is described in the "data length" parameter of the header portion of the TLV packet, and this value can be used.

Furthermore, the length (entire length) of the packet of the IP packet is described in the "packet length" parameter of the header portion of the IP packet, and this value can be used.

In a case where the length of the data portion of the TLV packet is not equal to the entire length of the IP packet, the value of the "packet length" parameter of the header portion of the IP packet may be corrected while it is assumed that the length of the data portion of the TLV packet be the entire length of the IP packet.

The description returns to the processing of the flowchart illustrated in FIG. 24.

It is determined in step S1105 whether there is a next subpacket. For example, in a case where the processing is performed on the IPv4 packet, since the UDP packet is provided as a subpacket, it is determined that there is a next subpacket in this case.

Note that it is possible to set the packets equal to or lower than the UDP packet not to be processed. In other words, the subpacket to be processed can be previously set. In a case of the subpacket which is set not to be processed, even if the subpacket exists as the subpacket, the processing is performed as assuming that there is no next subpacket in step S1105.

In a case where it has been determined in step S1105 that there is a next subpacket, the processing proceeds to step S1106, and the next subpacket is set to be a new subpacket to be processed. Then, the processing returns to step S1102, and the subsequent processing is repeated.

On the other hand, in a case where it has been determined in step S1105 that there is no next subpacket, the processing relative to the subpacket illustrated in FIG. 24 ends.

In this way, regarding the subpackets, by correcting the wrong parameter, the situations can be prevented such that the "data length" parameter is incorrect, the correct position of the head of the next packet is not found, and the processing fails, for example, since packet cannot be correctly invalidated.

As illustrated in FIG. 23, for example, a packet structure has been described as an example in which the subpackets are nested. In the nested packet structure, the IPv4 packet as a subpacket is included in the data portion of the TLV packet, and the UDP packet as a subpacket is included in the data portion of the IPv4 packet. In a case of this example, a single subpacket is included in the packet.

Figure 26:
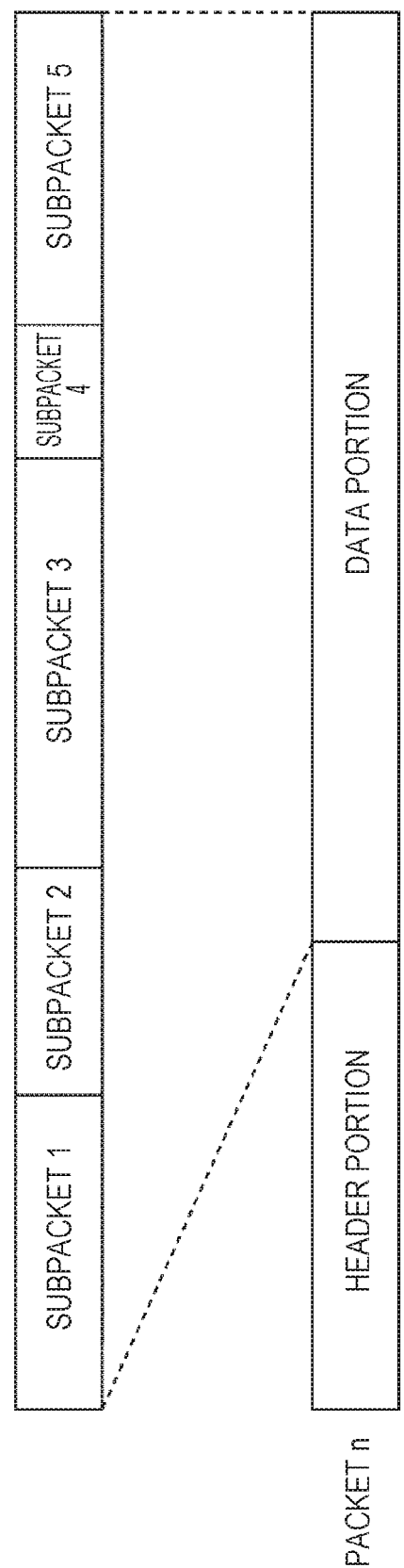
FIG. 26 is a diagram to describe another structure of the subpacket.

The present technology can be applied to a subpacket with a structure as illustrated in FIG. 26. The example of the subpacket illustrated in FIG. 26 is an example of a case where the plurality of subpackets is included in the packet.

In FIG. 26, a packet n includes five subpackets (subpackets 1 to 5) in the data portion. Here, all the subpackets are completed (start and end in data portion) within the data portion. Furthermore, here, the packet n is, for example, a TLV packet, and each of the subpackets 1 to 5 is, for example, an IPv4 packet.

Even in a case where such a packet is used, the block processing unit 17 (FIG. 4) can perform processing on the subpacket by performing the processing according to the flowcharts illustrated in FIGS. 24 and 25, similarly to a case where the single subpacket is included in the packet.

Since the processing in steps S1101 to S1104 and step S1106 in the flowchart illustrated in FIG. 24 is basically similar to the above description, the description thereof will be omitted here.

It is determined in step S1105 whether there is a next subpacket. For example, in a case where a subpacket to be processed (the subpacket) is the subpacket 1, the subpacket 2 is provided next to the subpacket 1. Therefore, in step S1105, it is determined that there is a next subpacket, and the processing proceeds to step S1106.

Similarly, in a case where the subpacket is any one of the subpackets 2 to 4, the subpackets 3 to 5 are respectively provided next to the subpackets 2 to 4. Therefore, in step S1105, it is determined that there is a next subpacket, and the processing proceeds to step S1106.

On the other hand, in a case where the subpacket is the subpacket 5, it is determined in step S1105 that there is no next subpacket, and the processing on the subpacket illustrated in FIG. 24 ends.

Since the processing in steps S1201 to S1210 in the flowchart illustrated in FIG. 25 is basically similar to the above description, the description thereof will be omitted here.

In this way, even in a case where the plurality of subpackets is included in the packet, by correcting the wrong parameter, regarding the subpackets, the situations can be prevented such that the "data length" parameter is incorrect, the correct position of the head of the next packet is not found, and the processing fails, for example, since the packet cannot be correctly invalidated.

<Processing in Packet Processing Unit>

Figure 27:
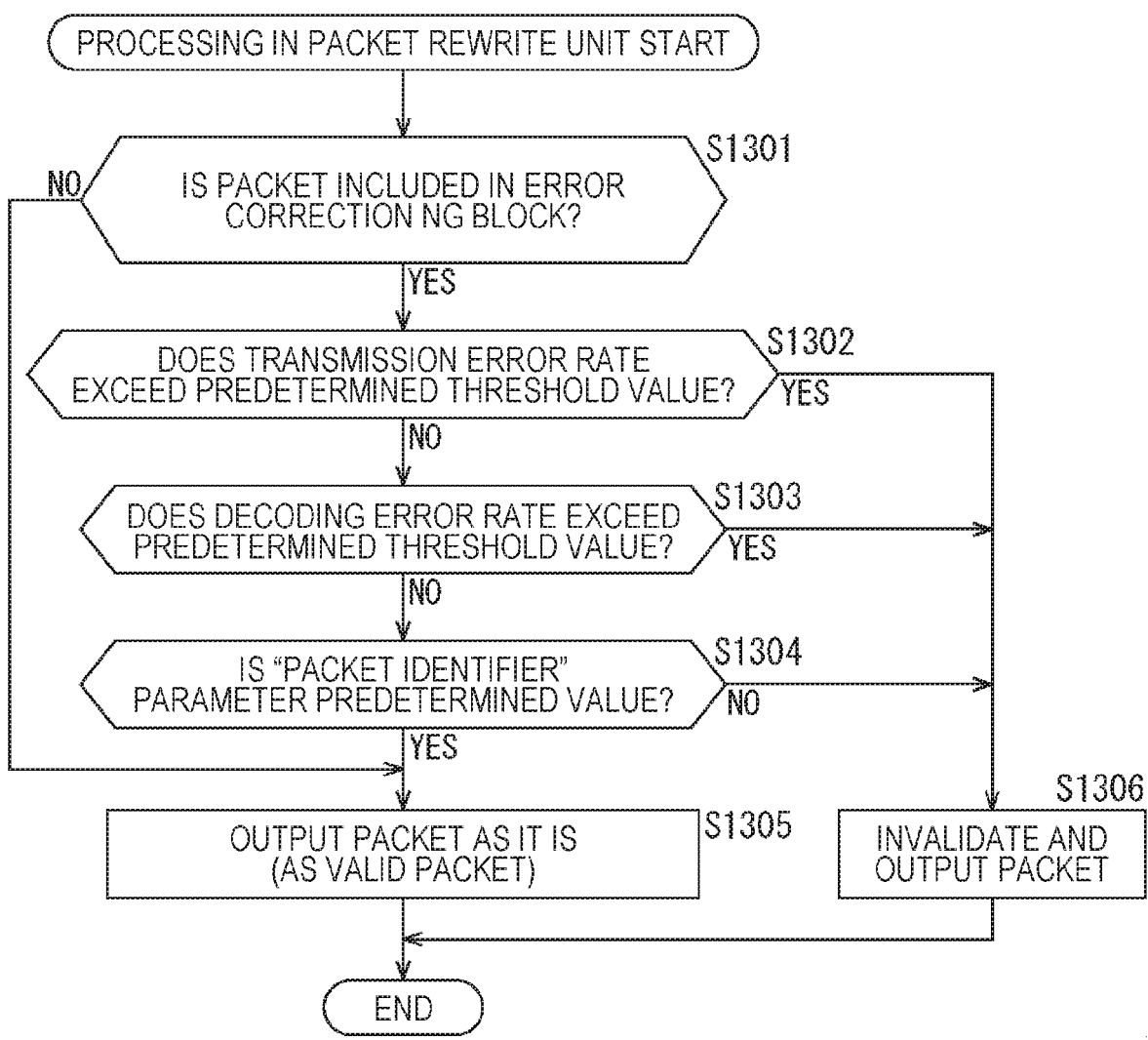
FIG. 27 is a flowchart to describe processing of the packet processing unit.

Next, processing of the packet processing unit 18, particularly, the packet rewrite unit 33 (FIG. 5) included in the packet processing unit 18 will be additionally described. With reference to the flowchart in FIG. 27, the processing of the packet rewrite unit 33 will be described.

It is determined in step S1301 whether the packet to be processed is included in the block of error correction NG. In a case where it has been determined in step S1301 that the packet is included in the block of error correction NG, the processing proceeds to step S1302.

In step S1302, it is determined whether a transmission error rate exceeds a predetermined threshold value. The transmission error rate is information indicating a reception state, and indicates, for example, a signal-noise ratio (SNR), and a modulation error rate (MER). Furthermore, the transmission error rate is included in the demodulation processing information, and the demodulation processing information is supplied from the demodulation processing unit 15 (FIG. 1) to the packet processing unit 18.

Furthermore, the transmission error rate may be, for example, a bit error rate (BER), and a forward error correction (FEC) block error rate (FER). In this case, the transmission error rate is included in the error correction processing information, and the error correction processing information is supplied from the error correction processing unit 16 (FIG. 1) to the packet processing unit 18.

In a case where it has been determined in step S1302 that the transmission error rate does not exceed the predetermined threshold value, the processing proceeds to step S1303. In step S1303, it is determined whether a decoding error rate exceeds a predetermined threshold value.

The decoding error rate indicates the number of decoding errors per unit time in decoding processing of video and audio. The decoding error rate is information to be supplied from the external post-stage processing device 2 such as a decoder.

Furthermore, in a case where information such as the decoding error rate cannot be obtained from the post-stage processing device 2, the processing in step S1303 may be omitted.

In a case where it has been determined in step S1303 that the decoding error rate does not exceed the predetermined threshold value, the processing proceeds to step S1304. It is determined in step S1304 whether the "packet identifier" parameter is a predetermined value.

For example, the "packet identifier" can be a "packet identification (packet_type)" parameter (eight bits) of the TLV packet. The "packet identification" parameter is a parameter to identify data stored in the data portion in the TLV packet.

Furthermore, for example, the "packet identifier" can be a parameter of the subpacket included in the TLV packet, such as, a "transmission source address (source_address)" parameter (32 bits/IPv4, 128 bits/IPv6) and a "destination address (destination_address)" parameter (similar) of an Internet Protocol (IP) packet. These parameters indicate a transmission source address and a destination address of the IP packet.

Furthermore, for example, the "packet identifier" can be a parameter of the subpacket included in the TLV packet, such as, a "transmission source port (source_port) parameter (16 bits) and a "destination port (destination_port)" parameter (similar) of a user datagram protocol (UDP) packet. These parameters indicate a transmission source port and a destination port of the UDP packet.

Furthermore, for example, the "packet identifier" can be a parameter of the subpacket included in the TLV packet, such as, a "packet identifier (packet_id)" parameter (16 bits) of a media transport protocol (MPEG) packet (MMTP). These parameters identify the data stored in the data portion in the MMTP packet. The data stored in the data portion relates to a video, audio, subtitles, superimposed text, control information, and the like.

Furthermore, for example, the "packet identifier" can be a combination of two or more parameters described above.

The "packet identifier" to be used is set according to the type of the packet to be processed by the packet rewrite unit 33.

In a case where it has been determined in step S1304 that the "packet identifier" parameter is the predetermined value, the processing proceeds to step S1305. In a case where it has been determined in step S1301 that the packet is included in the block of error correction NG, the processing proceeds to S1305.

The processing proceeds to step S1305 in a case where the packet is not included in the block in which the error correction is NG or the transmission error rate and the decoding error rate are equal to or less than the predetermined threshold value, in other words, in a case where the transmission error rate and the decoding error rate are within a range in which no problem is caused and a case where the "packet identifier" parameter is a predetermined value. In these cases, it can be determined that the packet is a normal packet.

The normal packet is output to the post-stage processing device 2 (FIG. 1) as a valid packet in step S1305.

On the other hand, in a case where it has been determined in step S1302 that the transmission error rate exceeds the predetermined threshold value, in a case where it has been determined in step S1303 that the decoding error rate exceeds the predetermined threshold value, or in a case where it has been determined in step S1304 that the "packet identifier" parameter is not the predetermined value, the processing proceeds to step S1306.

In a case where it has been determined that the packet is not normal, the processing proceeds to step S1306. Therefore, in step S1306, the packet is invalidated and output to the post-stage processing device 2.

In this way, even if the packet to be processed is included in the block of error correction NG, for example, if there is no problem in the transmission error rate and the like, the packet is output as a valid packet to be processed in the subsequent processing.

Traditionally, the packet included in the block of error correction NG has been invalidated even if the packet does not include errors. However, according to the present technology, as described above, even if the packet is included in the block of error correction NG, the packet is processed without being invalidated.

Here, with reference to FIG. 28, the processing of the packet processing unit 18 will be described again. A of FIG. 28 is a diagram of an exemplary input (packet row) to the packet processing unit 18. In this example, six packets (packets 1 to 6) are input to the packet processing unit 18. Here, it is assumed that "packet identifiers" of the packets 1 and 4 be A, "packet identifiers" of the packets 2 and 5 be B, and "packet identifiers" of the packets 3 and 6 be C.

B to D of FIG. 28 are diagrams of outputs (packet row) from the packet processing unit 18 in a case where the packet row in A of FIG. 28 has been input. In B to D of FIG. 28, hatched packets represent invalid packets, and non-hatched packets represent valid packets.

B of FIG. 28 is an output in a case where the block including the packet row is a block of error correction OK. Since the block is the block of error correction OK, that is, the block is a normal block, as illustrated in B of FIG. 28, all the packets are output as the valid packets.

C of FIG. 28 indicates an output in a case where the block including the packet row is a block of error correction NG, the transmission error rate and the decoding error rate are equal to or less than the threshold values up to the packet 3, and the error rate of any one of the packets 4 or later has exceeded the threshold value.

In this case, as illustrated in C of FIG. 28, the packets 1 to 3 are output as they are (as valid packet). Whereas, the packets 4 to 6 are invalidated and output. Note that, in this example, a case is indicated where all the values of A, B, and C are designated as the "packet identifiers".

D of FIG. 28 indicates an output in a case where the block including the packet row is a block of error correction NG, the transmission error rate and the decoding error rate are equal to or less than the threshold values in all the packets, and A and B are designated as the "packet identifiers".

In such a case, as illustrated in D of FIG. 28, the packets 1, 2, 4, and 5 are output as the valid packets. Whereas, the packets 3 and 6 are invalidated and output because the "packet identifiers" are not the predetermined values (in this case, not A or B).

Note that, although not shown, in a case where the block including the packet row is the block of error correction NG, all the packets 1 to 6 have been traditionally invalidated and output. As illustrated in C and D of FIG. 28, according to the present technology, even if the packet is included in the block of error correction NG, if the packet does not include an error, the packet is output as a valid packet without being invalidated.

Therefore, even in a case where the received block is the block of error correction NG, it is possible to pass more normal packets to the subsequent stage than the traditional case. As a result, the reception side, for example, the post-stage processing device 2 (FIG. 1) such as a decoder can perform processing, such as decoding reproduction, recording, redistribution, on more data.

As a specific effect, for example, in a case where only a video packet in a reception block has an error in a digital television receiver, video and audio have not been reproduced in traditional. However, by applying the present technology, it is possible to still display (freeze) the video and to reproduce the audio as normal. Furthermore, on the contrary, in a case where only an audio packet in the reception block has an error, it is possible to mute the audio and to reproduce the video as normal.

In the embodiment described above, it has been described that the processing for correcting (changing) the parameter such as the "data length" parameter is performed in the block processing unit 17, and the processing for rewriting (validating invalidation) is performed in the packet processing unit 18.

The correcting processing of the parameter in the block processing unit 17 and the packet rewrite processing in the packet processing unit 18 can be performed as independent processing. In other words, a relation between the processing such that the packet cannot be rewritten if the parameters are not corrected is not satisfied. Therefore, the processing can be performed independently.

In the above example, the reception processing unit 13 which performs both the parameter correction and the packet rewrite has been described as an example. The reception processing unit 13 can be configured so that the parameter is only corrected and is not rewritten, in other words, the block processing unit 17 performs the processing described above and the packet processing unit 18 performs general packet processing without rewriting the packet as described above.

In addition, the reception processing unit 13 can be configured so that the parameter is rewritten without being corrected, in other words, the block processing unit 17 does not perform the processing described above and performs processing relative to general block and the packet processing unit 18 performs the processing described above.

<Other Configuration of Reception Processing Unit>

As described above, in the reception processing unit 13 to which the present technology has been applied, for example, even if an error occurs in the "data length" parameter, the parameter can be corrected and output. For example, if the "data length" parameter is incorrect, the correct position of the head of the next packet is not found. However, according to the present technology, since the "data length" parameter is correctly amended, the correct position of the head of the next packet is found.

By founding the position of the head of the next packet, for example, it is possible to generate a synchronization signal of the packet as an accurate signal. Therefore, in FIG. 29, a configuration of a reception device 101 for generating and outputting the signal such as the packet synchronization signal of the packet is illustrated. Note that components similar to those of the reception device 11 illustrated in FIG. 1 are denoted with similar reference numerals, and the description thereof will be appropriately omitted.

Figure 29:
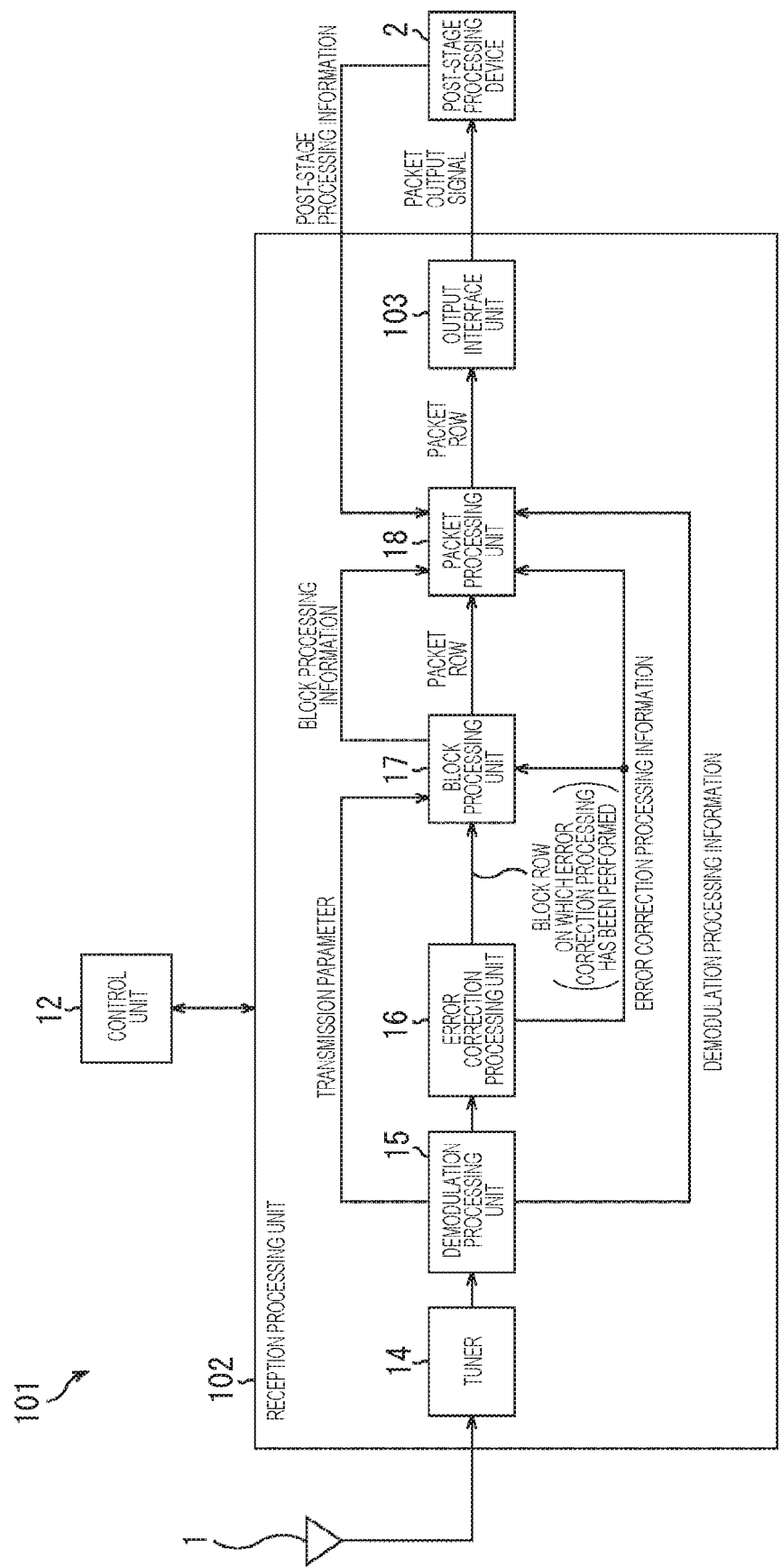
FIG. 29 is a block diagram of another exemplary configuration of a reception processing unit.

The reception device 101 illustrated in FIG. 29 includes a reception processing unit 102. The reception processing unit 102 has a configuration in which an output interface unit 103 is added to the reception processing unit 13 illustrated in FIG. 11. The other parts have configurations similar to those in the reception processing unit 13 illustrated in FIG. 1.

On the basis of the demodulation processing information (transmission error rate) supplied from the demodulation processing unit 15, the error correction processing information (transmission error rate) supplied from the error correction processing unit 16, the block processing information (error correction processing results in a packet unit) supplied from the block processing unit 17, and the post-stage processing information (for example, decoding error rate) supplied from the external post-stage processing device 2 (for example, decoder), the packet processing unit 18 of the reception processing unit 102 performs processing on the packet supplied from the block processing unit 17, and supplies the packet to the output interface unit 103.

The output interface unit 103 generates an output signal (packet output signal) of the packet supplied from the packet processing unit 18 (packet rewrite unit 33 (FIG. 5) included in packet processing unit 18), and outputs the generated signal to the external post-stage processing device 2 (for example, decoder). The "packet output signal" includes, for example, a transmission clock signal, a packet data signal, and a packet synchronization signal.

<Configuration of Output Interface Unit>

Figure 30:
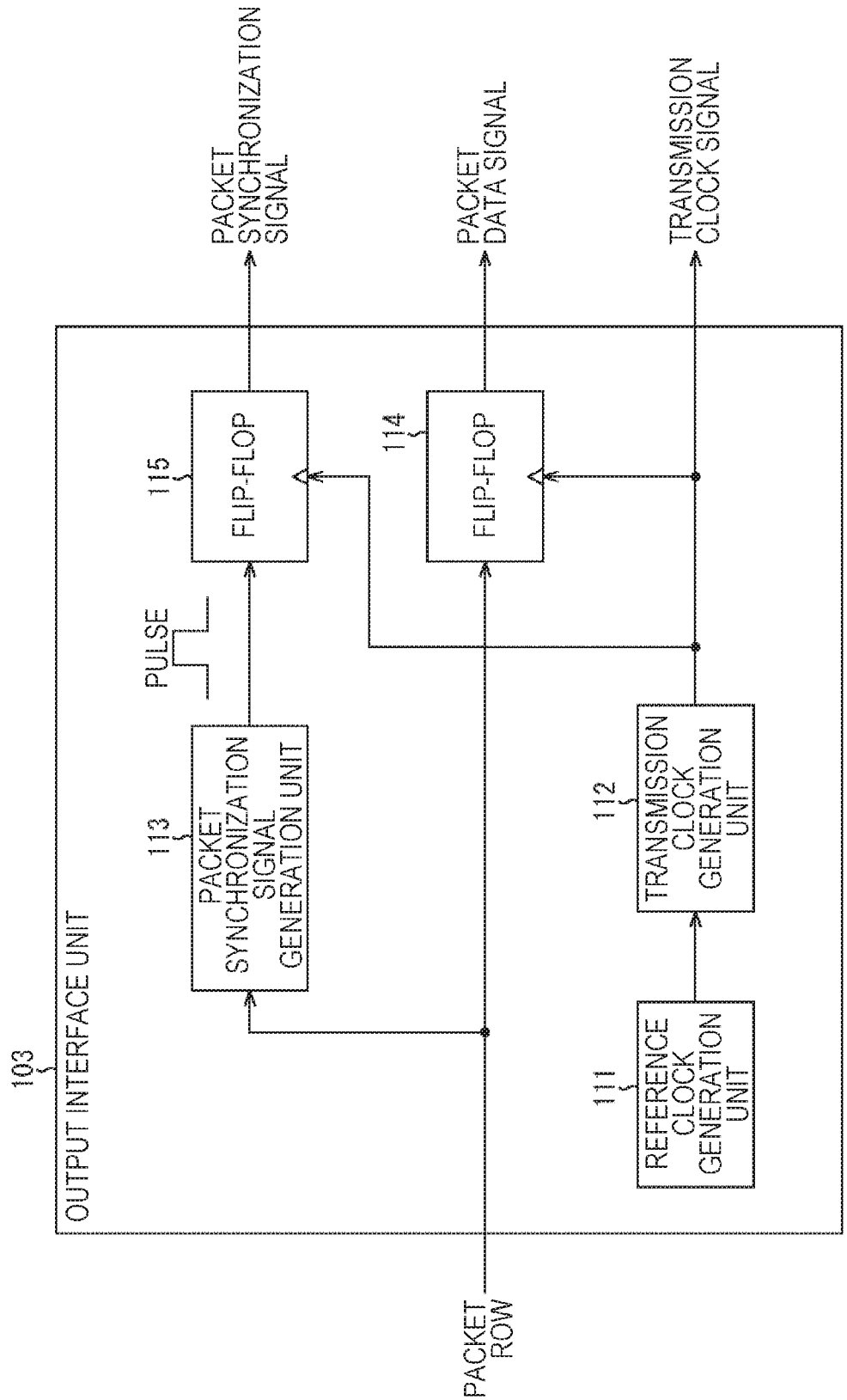
FIG. 30 is a block diagram of an exemplary configuration of an output interface unit.

FIG. 30 is a block diagram of a configuration of the output interface unit 103. The output interface unit 103 includes a reference clock generation unit 111, a transmission clock generation unit 112, a packet synchronization signal generation unit 113, and flip-flops 114 and 115.

The reference clock generation unit 111 generates a clock signal (reference clock signal) having a predetermined frequency, which is a reference of a transmission clock, and supplies the generated signal to the transmission clock generation unit 112.

The transmission clock generation unit 112 generates a transmission clock signal on the basis of the reference clock signal supplied from the reference clock generation unit 111 and outputs the transmission clock signal to the outside, for example, the post-stage processing device 2 and supplies the transmission clock signal to the flip-flops 114 and 115.

The packet synchronization signal generation unit 113 receives a packet row supplied from the packet processing unit 18 (FIG. 29) (packet rewrite unit 33 (FIG. 5)) as an input and generates a packet synchronization signal (pulse) corresponding to each packet and supplies the signal to the flip-flop 115. The "packet synchronization signal" is a signal which can specify a boundary (for example, head position of packet) of the packets by a device on the side which has received the signal.

The flip-flop 114 is a flip-flop which operates at a rising timing of the transmission clock signal supplied from the transmission clock generation unit 112. The flip-flop 114 receives a packet supplied from the packet processing unit 18 (packet rewrite unit 33 (FIG. 5)) and transmits the packet data signal to the outside.

The flip-flop 115 is a flip-flop which operates at a rising timing of the transmission clock signal supplied from the transmission clock generation unit 112. The flip-flop 115 receives the packet synchronization signal supplied from the packet synchronization signal generation unit 113 and transmits the signal to the outside.

The operation of the output interface unit 103 illustrated in FIG. 30 will be described with reference to signal waveforms illustrated in FIG. 31. The output interface unit 103 receives a packet as an input, generates the packet output signal, and outputs the packet output signal to the outside. The packet output signal includes a transmission clock signal, a packet data signal, and a packet synchronization signal.

Figure 31:
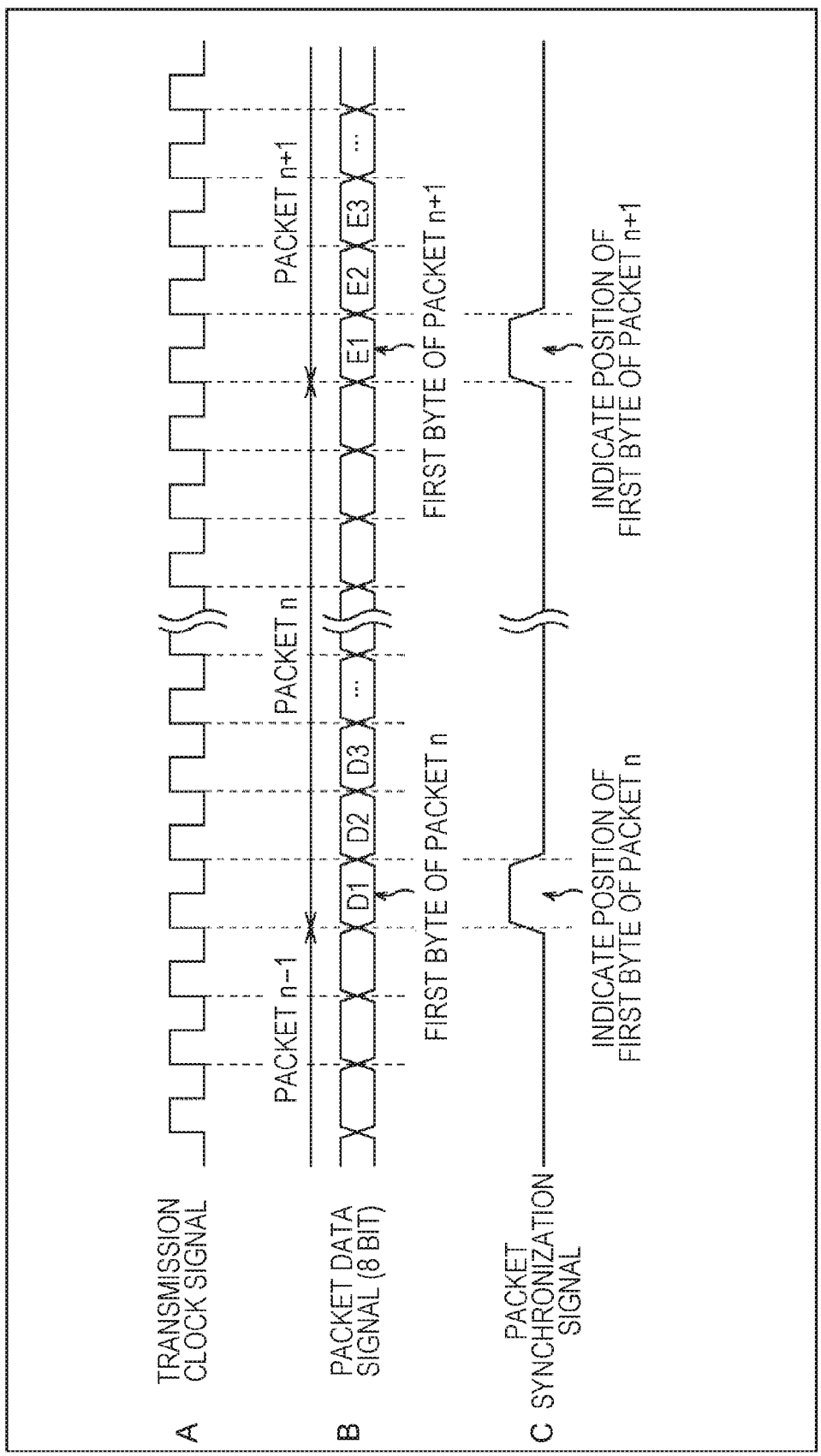
FIG. 31 is a diagram to describe an operation of the output interface unit.

A of FIG. 31 illustrates an output example of the transmission clock signal. B of FIG. 31 illustrates an output example of a packet data signal (signal width eight bits). As it can be understood from B of FIG. 31, the packet data signal is output by eight bits in synchronization with the transmission clock signal (A of FIG. 31).

For example, in a case of a packet n, packet data signals are D1, D2, D3, . . . . In a case of a packet n+1, packet data signals are E1, E2, E3, . . . . As a result, a device which has received the signal (for example, post-stage processing device 2) can receive the signal at the rising timing of the transmission clock signal.

C of FIG. 31 illustrates an output example of the packet synchronization signal (signal width one bit). As it can be understood from C of FIG. 31, the packet synchronization signal is asserted (positive logic in FIG. 31) at the position of the first byte of the packet data signal (B of FIG. 31).

For example, in a case of the packet n, the packet synchronization signal is asserted at the position of D1, and in a case of the packet n+1, the packet synchronization signal is asserted at the position of E1. Similar to the packet data signal, the packet synchronization signal is synchronized with the transmission clock signal (A of FIG. 31). As a result, the reception device of the signal (for example, post-stage processing device 2) can receive the signal at the rising timing of the transmission clock, and can find that the packet data signal (signal width eight bits in this example) received at the same timing is the first byte of the packet.

Furthermore, here, in the above example, the signal width of the packet data signal is eight bits. However, other bit width, such as, one bit can be applied to the present technology.

In the above example, the packet synchronization signal is asserted at the position of the first byte of the packet data signal. However, the assertion position can be appropriately changed according to the signal width of the packet data signal. For example, in a case where the signal width of the packet data signal is one bit, the packet data signal can be asserted at the position of its first bit.

In this way, according to the present technology, the packet synchronization signal capable of specifying the boundary of the packets can be generated. Furthermore, an interface unit for outputting such a signal in synchronization with the packet data signal can be provided.

<System Configuration>

A system including the reception device 11 will be described with reference to FIG. 32. Note that although the reception device 11 is described as an example here, the reception device 101 (FIG. 29) may be used as an example.

Figure 32:
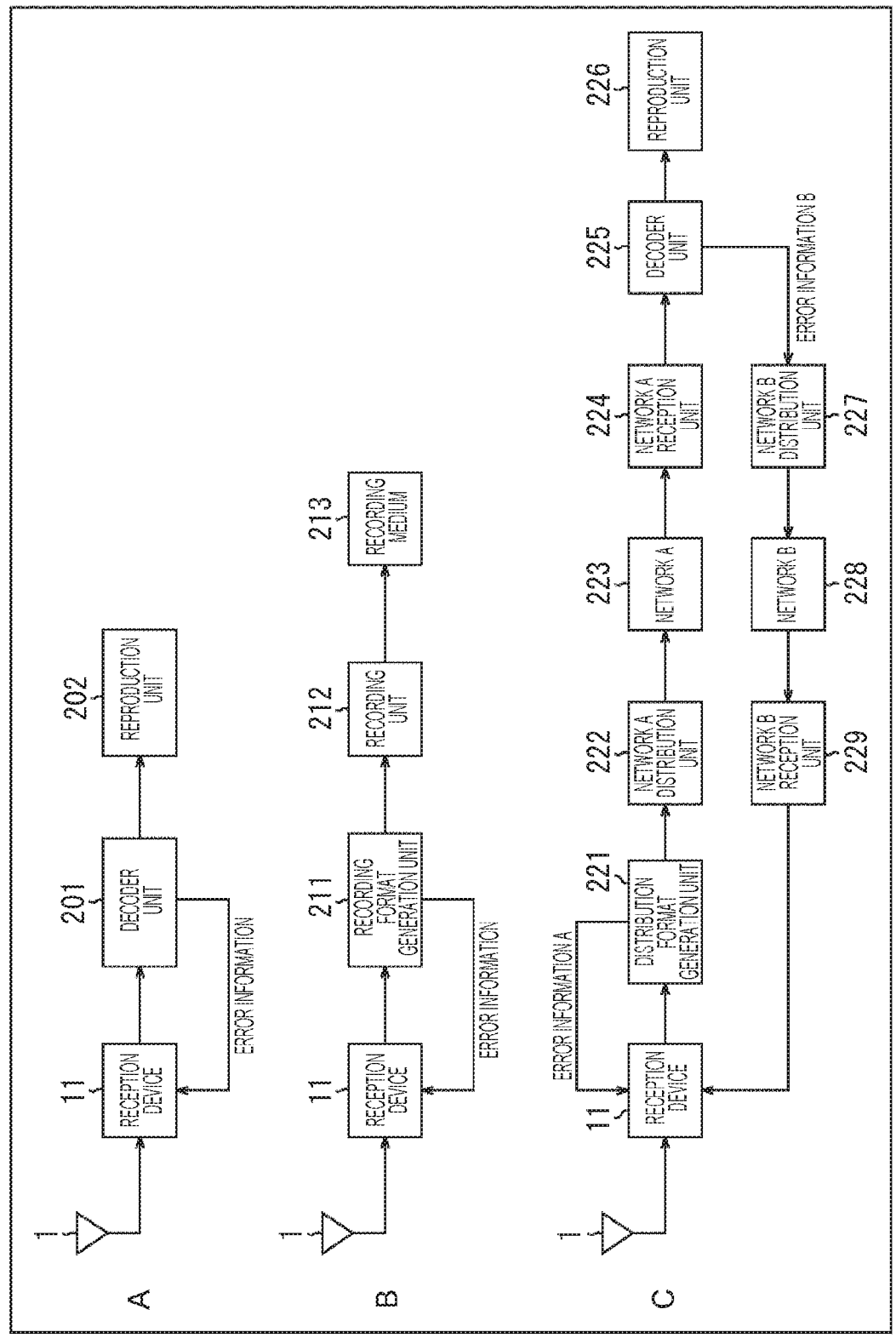
FIG. 32 is a block diagram of an exemplary system configuration.

A of FIG. 32 illustrates an exemplary configuration in a case where the reception device 11 is applied to a decoding and reproducing system which decodes and reproduces a broadcasted multiplexed stream. In the decoding and reproducing system illustrated in A of FIG. 32, a decoder unit 201 is connected as a post-stage processing device 2, and a reproduction unit 202 is further connected to the decoder unit 201.

In the decoding and reproducing system illustrated in A of FIG. 32, the multiplexed stream including the packets output from the reception device 11 is supplied to the decoder unit 201, and a decoded signal which is obtained as a result is supplied to the reproduction unit 202 and reproduced. Here, the decoder unit 201 includes, for example, a video decoder such as a moving picture experts group (MPEG) and an audio decoder. Furthermore, the reproduction unit 202 includes, for example, a display, and a speaker. Furthermore, in the decoding and reproducing system, error information obtained by the decoder unit 201 is fed back to the reception device 11.

Here, the reception device 11, the decode unit 201, and the reproduction unit 202 have been described as separated units. However, these units may be integrated.

B of FIG. 32 illustrates an exemplary configuration in a case where the reception device 11 is applied to a recording system for recording the broadcasted multiplexed stream on a recording medium. In the recording system illustrated in B of FIG. 32, a recording format generation unit 211 is connected to the reception device 11 as the post-stage processing device 2.

In the recording system illustrated in B of FIG. 32, the multiplexed stream including the packets output from the reception device 11 is supplied to the recording format generation unit 211. Then, a recording format which is obtained as a result is supplied to a recording unit 212 and is recorded on a recording medium 213. The recording medium 213 includes, for example, a digital versatile disc (DVD), a Blu-ray (registered trademark) disc, a hard disk drive, and a flash memory. Furthermore, in the recording system, error information obtained by the recording format generation unit 211 is fed back to the reception device 11.

Here, the reception device 11, the recording format generation unit 211, and the recording unit 212 have been described as separated units. However, these units may be integrated.

C of FIG. 32 illustrates an exemplary configuration in a case where the reception device 11 is applied to a distribution system for distributing the broadcasted multiplexed stream to a network. In the distribution system, the multiplexed stream including the packets output from the reception device 11 is supplied to a distribution format generation unit 221 and is converted into a format suitable for network distribution (for example, real-time transport protocol (RTP)). After that, the converted multiplexed stream is supplied to a network A distribution unit 222 and is distributed via a network A 223.

A decoder unit 225 receives a distribution format via a network A reception unit 224. The decoded signal obtained as a result is supplied to a reproduction unit 226 and reproduced. Note that, in the present system, error information A obtained by the distribution format generation unit 221 may be fed back to the reception device 11.

Furthermore, error information B from the decoder unit 225 may be fed back to the reception device 11 via a network B distribution unit 227, a network B 228, and a network B reception unit 229. Here, the network A and the network B may be the same and may be different from each other.

The reception device 11, the distribution format generation unit 221, network A distribution unit 222, and the network B reception unit 229 have been described as separated units. However, these units may be integrated.

In this way, the reception device 11 (reception device 101) to which the present technology has been applied can form a part of a system such as the decoding and reproducing system, the recording system, and the distribution system.

<Regarding Recording Medium>

The above-mentioned series of processing can be performed by hardware and software. In a case where the series of the processing is executed by the software, a program included in the software is installed in a computer. Here, the computer includes a computer incorporated in dedicated hardware and, for example, a general personal computer which can perform various functions by installing various programs.

Figure 33:
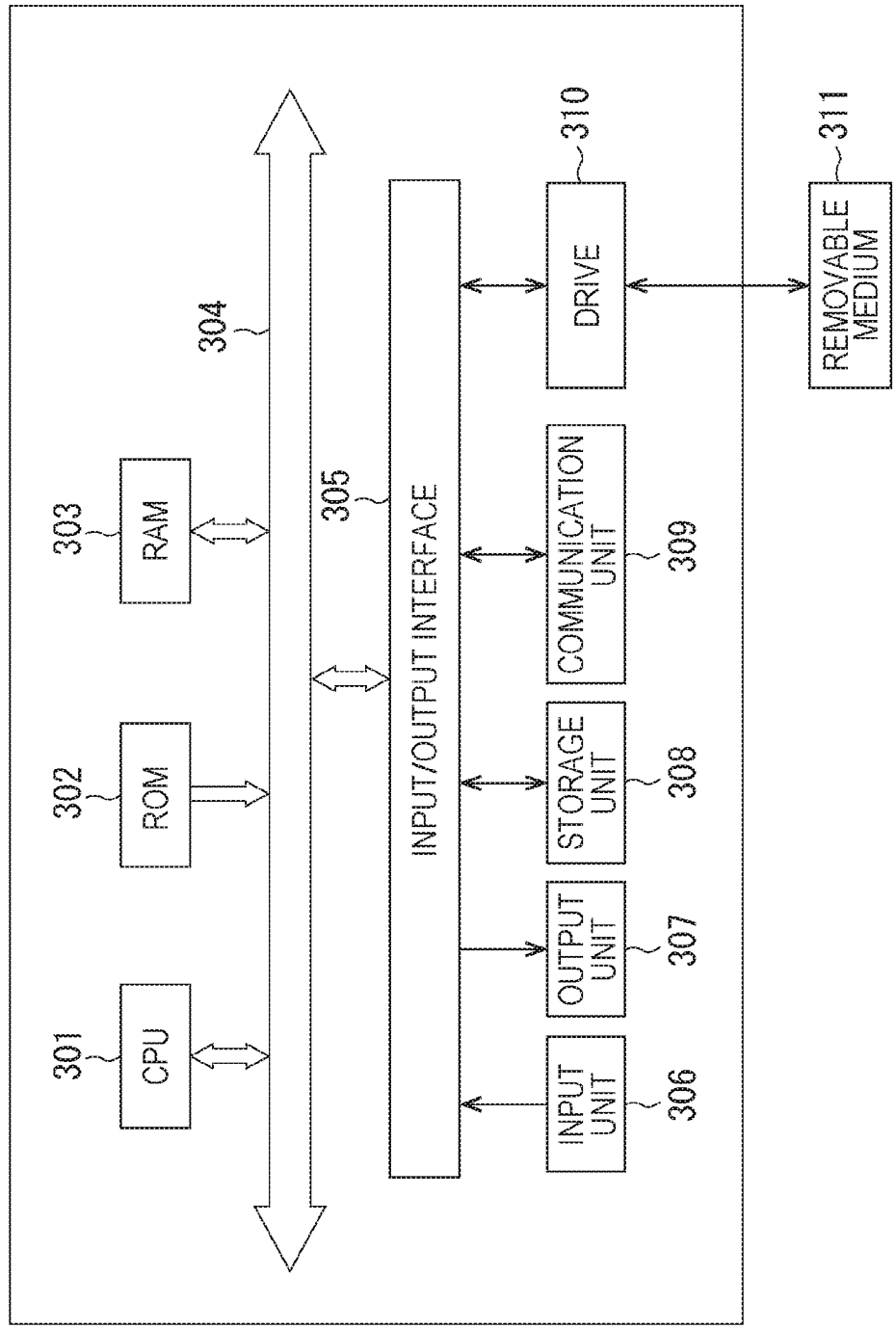
FIG. 33 is a diagram to describe a recording medium.

FIG. 33 is a block diagram of an exemplary configuration of hardware of the computer for executing the above-mentioned series of processing by the program. In a computer, a central processing unit (CPU) 301, a read only memory (ROM) 302, and a random access memory (RAM) 303 are connected to each other with a bus 304. In addition, an input/output interface 305 is connected to the bus 304. An input unit 306, an output unit 307, a storage unit 308, a communication unit 309, and a drive 310 are connected to the input/output interface 305.

The input unit 306 includes a keyboard, a mouse, a microphone, and the like. The output unit 307 includes a display, a speaker, and the like. The storage unit 308 includes a hard disk, a non-volatile memory, and the like. The communication unit 309 includes a network interface and the like. The drive 310 drives a removable medium 311 such as a magnetic disk, an optical disk, an optical magnetic disk, or a semiconductor memory.

In the computer configured as above, the CPU 301 loads, for example, the program stored in the storage unit 308 to the RAM 303 via the input/output interface 305 and the bus 304 and executes the program so that the above-mentioned series of processing is executed.

The program executed by the computer (CPU 301), for example, can be provided by recording it to the removable medium 311 as a package medium and the like. Furthermore, the program can be provided via a wired or wireless transmission media such as a local area network, the internet, and a digital satellite broadcast.

In the computer, the program can be installed to the storage unit 308 via the input/output interface 305 by mounting the removable medium 311 in the drive 310. Furthermore, the program can be received by the communication unit 309 via the wired or wireless transmission media and installed to the storage unit 308. In addition, the program can be previously installed to the ROM 302 and the storage unit 308.

Note that, the program performed by the computer may be a program in which processing is performed along the order described herein in a time series manner and a program in which the processing is performed in parallel or at a necessary timing when a call has been performed.

Furthermore, in the present specification, the system indicates a whole device including a plurality of devices.

Note that the effects described herein are only exemplary and not limited to these. Also, there may be an additional effect.

Furthermore, the embodiment of the present technology is not limited to the above-mentioned embodiment, and various changes can be made without departing from the scope of the present technology.

Furthermore, the embodiment of the present invention is not limited to the broadcast standards described above, and can be applied to other types of digital broadcast standards without departing from the scope of the present invention.

Note that, the present technology can have the configuration below.

(1)

A signal processing apparatus including:

a block information acquisition unit configured to specify a block length from a transmission parameter, attached to a block, of a multiplexed stream including the series of blocks;

a packet information acquisition unit configured to analyze the block and acquire a packet parameter;

a pattern information acquisition unit configured to analyze the block and acquire specific pattern position information; and a packet division unit configured to specify a boundary between the packets included in the block on the basis of the block length, the packet parameter, and the specific pattern position information.

(2)

The signal processing apparatus according to (1), in which the packet division unit detects and corrects an error of a predetermined parameter of the packet.

(3)

The signal processing apparatus according to (1) or (2), in which the packet parameter is a parameter relating to a synchronization pattern of the packet.

(4)

The signal processing apparatus according to any one of (1) to (3), in which the packet parameter is a parameter related to the data length of the packet.

(5)

The signal processing apparatus according to any one of (1) to (4), in which the specific pattern position information is position information of a value set by a predetermined standard.

(6)

The signal processing apparatus according to any one of (1) to (5), in which on the basis of a parameter of a subpacket included in the packet obtained by analyzing the packet and packet internal specific pattern position information, a boundary between the subpackets is further specified.

(7)

The signal processing apparatus according to (6), in which an error of a predetermined parameter of the subpacket is detected and corrected.

(8)

The signal processing apparatus according to (6) or (7), in which the parameter of the subpacket is a parameter related to a synchronization pattern of the subpacket.

(9)

The signal processing apparatus according to any one of (6) to (8), in which the parameter of the subpacket is a parameter related to a data length of the subpacket.

(10)

The signal processing apparatus according to any one of (6) to (9), in which the packet internal specific pattern position information is position information of a value set by a predetermined standard.

(11)

The signal processing apparatus according to any one of (1) to (10), in which the packet is a TLV packet, the block is a main signal of a slot, and the transmission parameter is TMCC information.

(12)

A signal processing method including:

specifying a block length from a transmission parameter attached to a block of a multiplexed stream including the series of blocks;

analyzing the block and acquiring a packet parameter;

analyzing the block and acquiring specific pattern position information; and specifying a boundary between packets included in the block on the basis of the block length, the packet parameter, and the specific pattern position information.

(13)

A signal processing apparatus including:

a packet information acquisition unit configured to analyze a packet of a multiplexed stream including a series of packets and acquire a parameter of the packet; and a packet rewrite unit configured to rewrite a content of the packet by using the parameter which is acquired by the packet information acquisition unit.

(14)

The signal processing apparatus according to (13), in which the packet rewrite unit invalidates the packet on the basis of a reception state.

(15)

The signal processing apparatus according to (13) or (14), in which the packet rewrite unit invalidates the packet on the basis of a state of subsequent processing.

(16)

The signal processing apparatus according to any one of (13) to (15), in which the packet rewrite unit invalidates the packet on the basis of the parameter of the packet.

(17)

The signal processing apparatus according to any one of (13) to (16), in which the parameter of the packet is a parameter relating to a packet identifier of the packet.

(18)

The signal processing apparatus according to any one of (13) to (17), in which the packet is a TLV packet.

(19)

The signal processing apparatus according to any one of (13) to (18), further including:

an output interface unit configured to generate a packet synchronization signal capable of specifying a boundary between the packets as receiving an output from the packet rewrite unit as an input and output the packet synchronization signal in synchronization with a packet data signal.

(20)

A signal processing method including:

analyzing a packet of a multiplexed stream including a series of packets and acquiring a parameter of the packet; and rewriting a content of the packet by using the acquired parameter.

REFERENCE SIGNS LIST 11 reception device
12 control unit
13 reception processing unit
14 tuner
15 demodulation processing unit
16 error correction processing unit
17 block processing unit
18 packet processing unit
21 buffer
22 block information acquisition unit
23 packet information acquisition unit
24 pattern information acquisition unit
25 packet division unit
31 buffer
32 packet information acquisition unit
33 packet rewrite unit
101 reception device
102 reception processing unit
103 output interface unit
111 reference clock generation unit 112 transmission clock generation unit
113 packet synchronization signal generation unit
114, 115 flip-flop

The invention claimed is:

1. A reception apparatus comprising:
   a block information acquisition circuitry configured to generate a block length from a transmission parameter, attached to a block, of a multiplexed stream including a series of blocks;
   a packet information acquisition circuitry configured to analyze the block to acquire the block length from the block information acquisition circuitry and to generate a packet parameter;
   a pattern information acquisition circuitry configured to analyze the block to generate specific pattern position information; and
   a packet division circuitry configured to specify a boundary between packets included in the block on the basis of the block length, the packet parameter, and the specific pattern position information.

2. The reception apparatus according to claim 1, wherein the packet division circuitry is configured to detect and correct an error of a predetermined parameter of one of the packets.

3. The reception apparatus according to claim 1, wherein the packet parameter is a parameter relating to a synchronization pattern of one of the packets.

4. The reception apparatus according to claim 1, wherein the packet parameter is a parameter related to a data length of one of the packets.

5. The reception apparatus according to claim 1, wherein the specific pattern position information is position information of a value set by a predetermined standard.

6. The reception apparatus according to claim 1, wherein on the basis of a parameter of a subpacket included in one of the packets obtained by analyzing the one of the packets and packet internal specific pattern position information, a boundary between subpackets is further specified.

7. The reception apparatus according to claim 6, wherein an error of a predetermined parameter of the subpacket is detected and corrected.

8. The reception apparatus according to claim 6, wherein the parameter of the subpacket is a parameter related to a synchronization pattern of the subpacket.

9. The reception apparatus according to claim 6, wherein the parameter of the subpacket is a parameter related to a data length of the subpacket.

10. The reception apparatus according to claim 6, wherein the packet internal specific pattern position information is position information of a value set by a predetermined standard.

11. The reception apparatus according to claim 1, wherein one of the packets is a type length value (TLV) packet, the block is a main signal of a slot, and the transmission parameter is transmission and multiplexing configuration control (TMCC) information.

12. A signal processing method comprising: receiving a multiplexed stream including a series of blocks;
   generating a block length from a transmission parameter attached to a block of the multiplexed stream including the series of blocks;
   analyzing the block to acquire the block length and to generate a packet parameter; analyzing the block to generate specific pattern position information; and specifying a boundary between packets included in the block on the basis of the block length, the packet parameter, and the specific pattern position information.

* * * * *